US012672051B2

(12) United States Patent
Luo et al.

(10) Patent No.: US 12,672,051 B2
(45) Date of Patent: Jun. 30, 2026

(54) ACCESS POINT AND WIRELESS COMMUNICATION METHOD

(71) Applicant: GUANGDONG OPPO MOBILE TELECOMMUNICATIONS CORP., LTD., Dongguan (CN)

(72) Inventors: Chaoming Luo, Dongguan (CN); Lei Huang, Singapore (SG); Liuming Lu, Dongguan (CN); Pei Zhou, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 321 days.

(21) Appl. No.: 18/363,728

(22) Filed: Aug. 1, 2023

(65) Prior Publication Data

US 2024/0023009 A1 Jan. 18, 2024

Related U.S. Application Data

(63) Continuation of application No. PCT/CN2021/092159, filed on May 7, 2021.

(51) Int. Cl.
| | |
|---|---|
| *H04W 48/16* | (2009.01) |
| *H04W 48/14* | (2009.01) |
| *H04W 84/12* | (2009.01) |

(52) U.S. Cl.
CPC ........... *H04W 48/16* (2013.01); *H04W 48/14* (2013.01); *H04W 84/12* (2013.01)

(58) Field of Classification Search
CPC ..................................................... H04W 48/16
See application file for complete search history.

(56) References Cited

U.S. PATENT DOCUMENTS

| | | | |
|---|---|---|---|
| 2020/0221545 A1 | 7/2020 | Stacey et al. | |
| 2020/0359248 A1 | 11/2020 | Sadeghi et al. | |
| 2022/0053361 A1* | 2/2022 | Thubert ............ | H04W 28/0236 |
| 2023/0224695 A1* | 7/2023 | Jang ........................ | G01S 13/003 |
| | | | 370/338 |
| 2024/0015640 A1* | 1/2024 | Gan ........................ | H04W 48/16 |
| 2024/0064837 A1* | 2/2024 | Kim ........................ | H04L 5/0053 |

FOREIGN PATENT DOCUMENTS

CN      111800769      10/2020

OTHER PUBLICATIONS

EPO, Examination Report for EP Application No. 21939682.7, Nov. 12, 2024.

(Continued)

*Primary Examiner* — Abdeltif Ajid
(74) *Attorney, Agent, or Firm* — Hodgson Russ LLP

(57) ABSTRACT

An access point (AP) and a wireless communication method are provided. The wireless communication method includes performing, by an AP, a first sensing discovery and a second sensing discovery which are integrated or independent with a multilink discovery. In the first sensing discovery, the AP transmits, to a station (STA), essential sensing capabilities of the reporting AP and/or one or more reported APs. In the second sensing discovery, the AP transmits, to the STA, complete sensing capabilities of the reporting AP and/or the one or more reported APs.

20 Claims, 23 Drawing Sheets

800

802

Performing, by an access point (AP), a first sensing discovery and a second sensing discovery which are integrated or independent with a multilink discovery, wherein in the first sensing discovery, the AP transmits, to a station (STA), essential sensing capabilities of the reporting AP and/or one or more reported APs, and in the second sensing discovery, the AP transmits, to the STA, complete sensing capabilities of the reporting AP and/or the one or more reported APs

(56) References Cited

OTHER PUBLICATIONS

Huawei, "Specification Framework for TGbe," IEEE 802.11-19/1262r23, IEEE P802.11, Wireless LANs, Jan. 2021.

EPO, Extended European Search Report for EP Application No. 21939682.7, Jan. 18, 2024.

"Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)," IEEE P802.11be™/D0.4, Mar. 2021.

Intel et al., "CR for CIDs related to NSTR Capability signalling," IEEE 802.11-21/0222r0, IEEE P802.11 Wireless LANs, Feb. 21, 2021.

Qualcomm Inc. et al., "Resolution for CIDs related to Multi-Link element (CC 34)—Part 1," IEEE 802.11-21/0242r4, IEEE P802.11 Wireless LANs, Feb. 9, 2021.

Qualcomm Inc. et al., "Resolution for CIDs related to Multi-Link element (CC 34)—Part 2," IEEE 802.11-21/0254r5, IEEE P802.11 Wireless LANs, Mar. 20, 2021.

Qualcomm Inc. et al., "Resolution for CIDs related to Multi-Link element (CC 34)—Part 3," IEEE 802.11-21/0506r3, IEEE P802.11 Wireless LANs, Mar. 21, 2021.

Panasonic et al., "Comment Resolutions for 11be D0.3 ML element Type CIDs," IEEE 802.11-21/0301r1, IEEE P802.11 Wireless LANs, Feb. 22, 2021.

Huawei, "CR for Capability Information field Related CIDs," IEEE 802.11-21/0633r0, IEEE P802.11 Wireless LANs, Apr. 1, 2021.

Intel, "Resolutions for CC34 CIDs for MLO Discovery procedures, RNR," IEEE 802.11-21/0281r4, IEEE P802.11 Wireless LANs, Mar. 1, 2021.

Intel, "Wi-Fi Sensing Definitions," IEEE 802.11-20/1849r4, Nov. 15, 2020.

Intel, "Overview of Wi-Fi sensing protocol," IEEE 802.11-20/1851r3, Nov. 12, 2020.

Vestel, "Wi-Fi Sensing Parameters," IEEE 802.11-21/0365r1, Mar. 3, 2021.

Intel, "Discussion of Sensing Measurement Result Types," IEEE 802.11-21/0357r0, Mar. 5, 2020.

Qualcomm Inc. et al., "Resolution for CIDs related to MLO Discovery (CC 34)," IEEE 802.11-21/0650r4, IEEE P802.11 Wireless LANs, Apr. 10, 2021.

Oppo, "WLAN Sensing Discovery," IEEE 802.11-21/0647r1, Apr. 16, 2021.

Apple Inc., "AP MLD Beaconing and Discovery," IEEE 802.11-20/865r2, Jul. 29, 2020.

LG Electronics, "Indication of Multi-link Information: Follow-up," IEEE 802.11-20/0741r3, May 11, 2020.

WIPO, International Search Report and Written Opinion for PCT/CN2021/092159, Feb. 9, 2022.

* cited by examiner

700

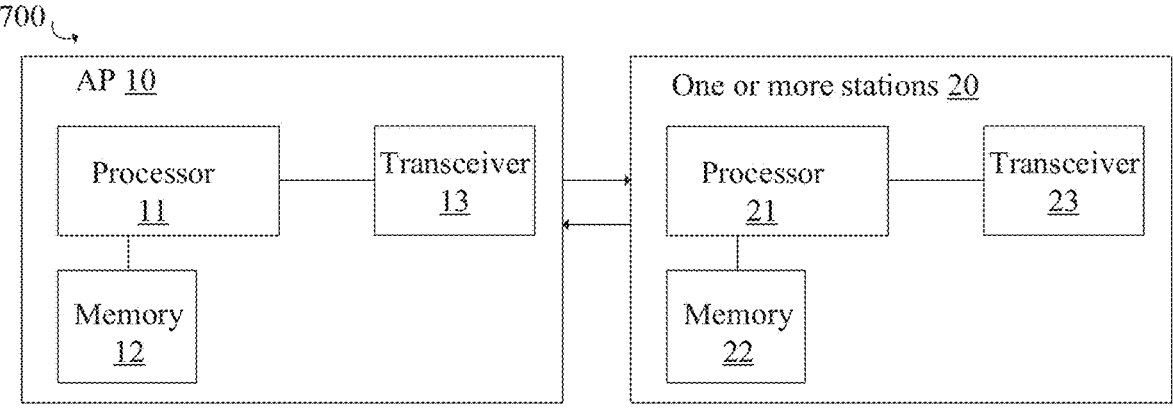

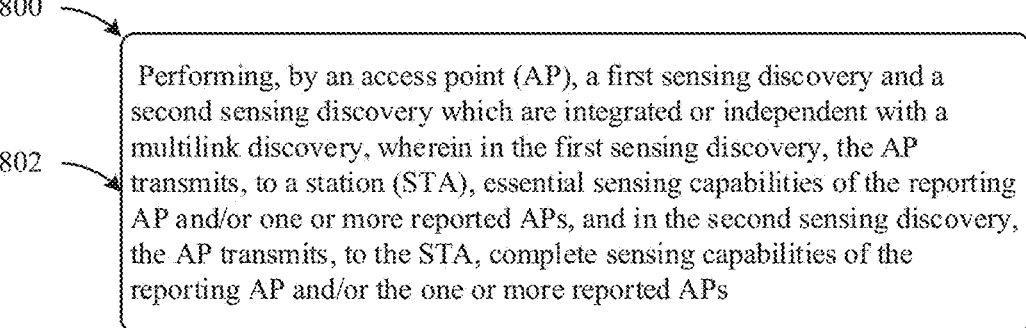

802

Performing, by an access point (AP), a first sensing discovery and a second sensing discovery which are integrated or independent with a multilink discovery, wherein in the first sensing discovery, the AP transmits, to a station (STA), essential sensing capabilities of the reporting AP and/or one or more reported APs, and in the second sensing discovery, the AP transmits, to the STA, complete sensing capabilities of the reporting AP and/or the one or more reported APs

Performing, by a station (STA), a first sensing discovery and a second sensing discovery which are integrated or independent with a multilink discovery, wherein in the first sensing discovery, the STA receives, from an access point (AP), essential sensing capabilities of the reporting AP and/or one or more reported APs, and in the second sensing discovery, the STA receives, from the AP, complete sensing capabilities of the reporting AP and/or the one or more reported APs

FIG. 6

ACCESS POINT AND WIRELESS COMMUNICATION METHOD

CROSS REFERENCE TO RELATED APPLICATION(S)

This application is a continuation of International Application No. PCT/CN2021/092159, filed May 7, 2021, the entire disclosure of which is incorporated herein by reference.

BACKGROUND OF DISCLOSURE

1. Field of the Disclosure

The present disclosure relates to the field of communication systems, and more particularly, to an access point (AP) and a wireless communication method, which can provide a good communication performance and/or provide high reliability.

2. Description of the Related Art

Communication systems such as wireless communication systems are widely deployed to provide various types of communication content such as voice, video, packet data, messaging, broadcast, and so on. These communication systems may be multiple-access systems capable of supporting communication with multiple users by sharing available system resources (such as, time, frequency, and power). A wireless network, for example a wireless local area network (WLAN), such as a Wi-Fi (institute of electrical and electronics engineers (IEEE) 802.11) network may include an access point (AP) that may communicate with one or more stations (STAs) or mobile devices. The WLAN enables a user to wirelessly access an internet based on radio frequency technology in a home, an office, or a specific service area using a portable terminal such as a personal digital assistant (PDA), a laptop computer, a portable multimedia player (PMP), a smartphone, etc. The AP may be coupled to a network, such as the internet, and may enable a mobile device to communicate via the network (or communicate with other devices coupled to the AP). A wireless device may communicate with a network device bi-directionally. For example, in a WLAN, a STA may communicate with an associated AP via downlink and uplink. The downlink may refer to a communication link from the AP to the STA, and the uplink may refer to a communication link from the STA to the AP.

IEEE 802.11bf working group (WG) is working on a WLAN sensing feature and has discussed general sensing roles, general sensing procedures, sensing parameters, and measurement types. In these discussions, method of using existing 802.11 WLAN discovery procedure (or called general discovery procedure) is implied for a non-AP STA to solicit sensing capabilities of an AP. IEEE 802.11be WG has introduced a multi-link device (MLD) in a WLAN extreme high throughput (EHT) feature and defined a multi-link (ML) discovery procedure for a STA affiliated with a non-AP MLD to solicit ML capabilities of APs affiliated with an AP MLD. It's not discussed yet, for a STA affiliated with a non-AP MLD, how to efficiently discover sensing capabilities of APs affiliated with an AP MLD.

Therefore, there is a need for an access point (AP), a station (STA), and a wireless communication method, which can solve issues in the prior art, provide sensing discovery including multi-link device-level (MLD-level) discovery and/or link-level discovery, achieve extremely high throughput, provide good communication performance, and/or provide high reliability.

SUMMARY

In a first aspect of the present disclosure, a wireless communication method comprises performing, by an access point (AP), a first sensing discovery and a second sensing discovery which are integrated or independent with a multilink discovery, wherein in the first sensing discovery, the AP transmits, to a station (STA), essential sensing capabilities of the reporting AP and/or one or more reported APs, and in the second sensing discovery, the AP transmits, to the STA, complete sensing capabilities of the reporting AP and/or the one or more reported APs.

In a second aspect of the present disclosure, a wireless communication method comprises performing, by a station (STA), a first sensing discovery and a second sensing discovery which are integrated or independent with a multilink discovery, wherein in the first sensing discovery, the STA receives, from an access point (AP), essential sensing capabilities of the reporting AP and/or one or more reported APs, and in the second sensing discovery, the STA receives, from the AP, complete sensing capabilities of the reporting AP and/or the one or more reported APs.

In a third aspect of the present disclosure, an access point (AP) comprises a memory, a transceiver, and a processor coupled to the memory and the transceiver. The processor is configured to perform a first sensing discovery and a second sensing discovery which are integrated or independent with a multilink discovery, wherein in the first sensing discovery, the transceiver transmits, to a station (STA), essential sensing capabilities of the reporting AP and/or one or more reported APs, and in the second sensing discovery, the transceiver transmits, to the STA, complete sensing capabilities of the reporting AP and/or the one or more reported APs.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 4 is a block diagram of one or more stations (STAs) and an access point (AP) of communication in a wireless communications system according to an embodiment of the present disclosure.

FIG. 5 is a flowchart illustrating a wireless communication method performed by an AP according to an embodiment of the present disclosure.

FIG. 6 is a flowchart illustrating a wireless communication method performed by a STA according to another embodiment of the present disclosure.

information of a basic variant multi-link (ML) element according to an embodiment of the present disclosure.

Figure 8:
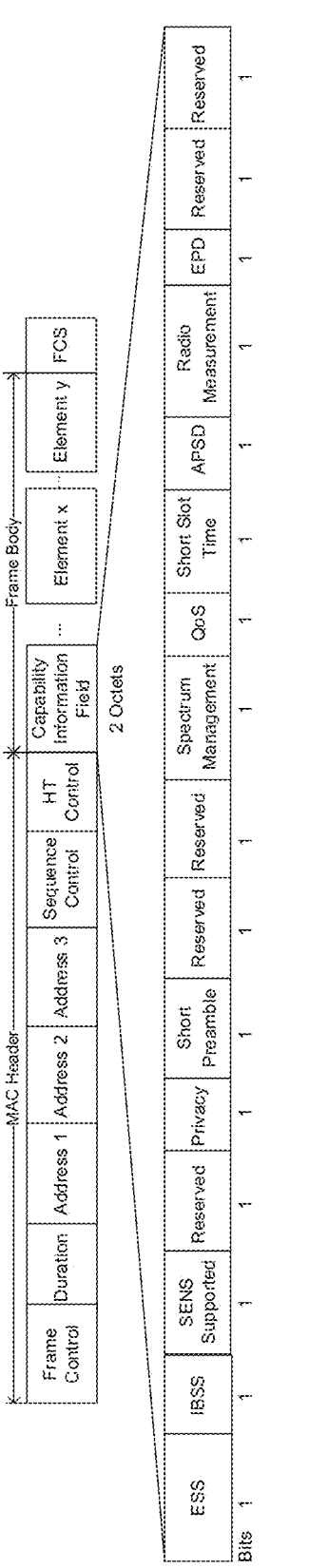

FIG. 8 is a schematic diagram illustrating an example of an indication of the reporting AP in a capability information field according to an embodiment of the present disclosure.

Figure 9:
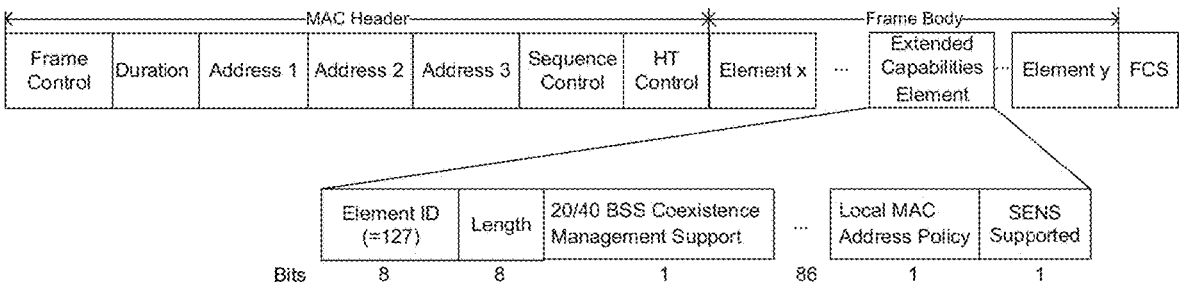

FIG. 9 is a schematic diagram illustrating an example of an indication of the reporting AP in an extended capabilities element according to an embodiment of the present disclosure.

Figure 10:
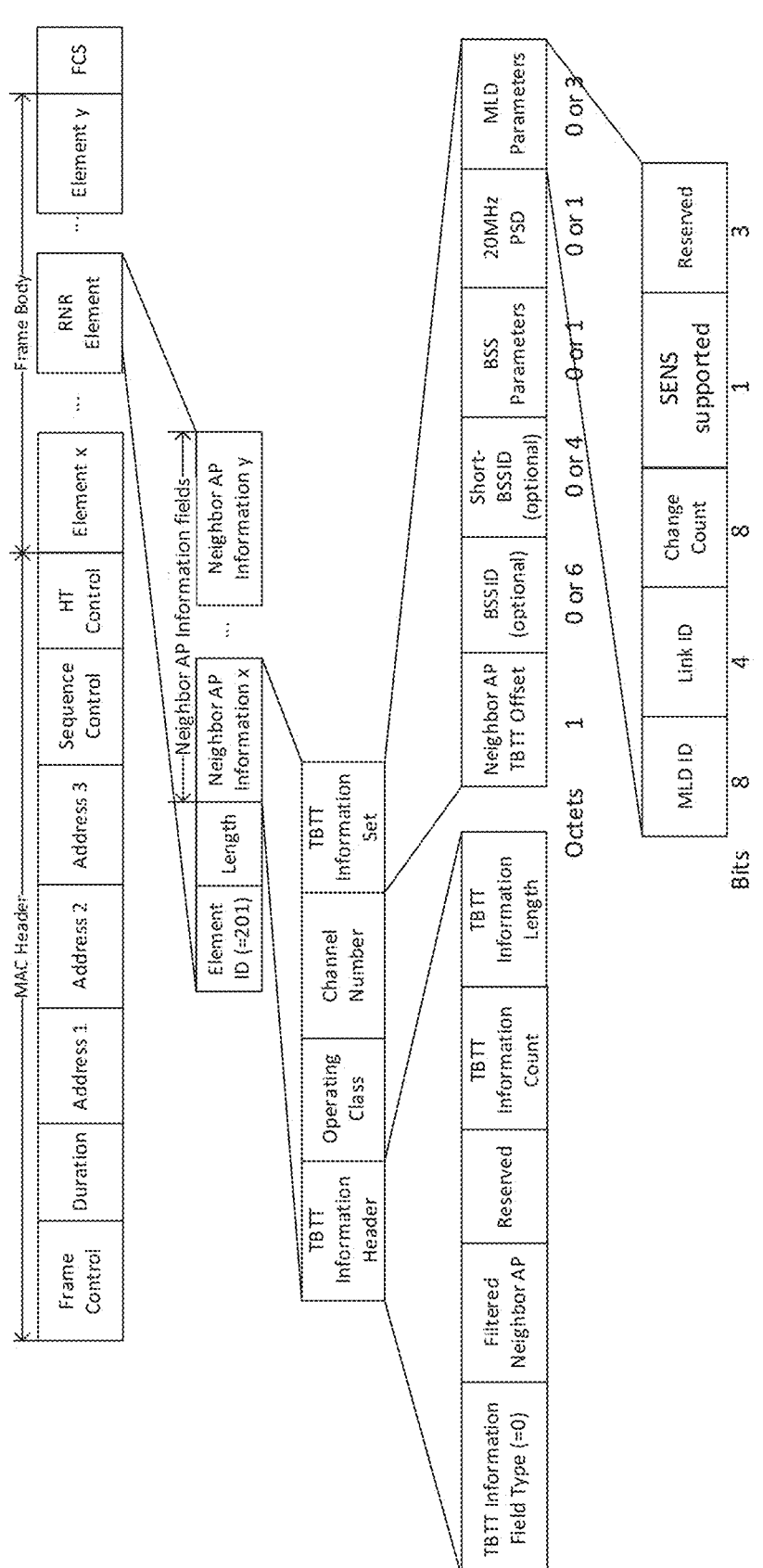

FIG. 10 is a schematic diagram illustrating an example of an indication of a reported AP in a reduced neighbor report (RNR) element according to an embodiment of the present disclosure.

Figure 11:
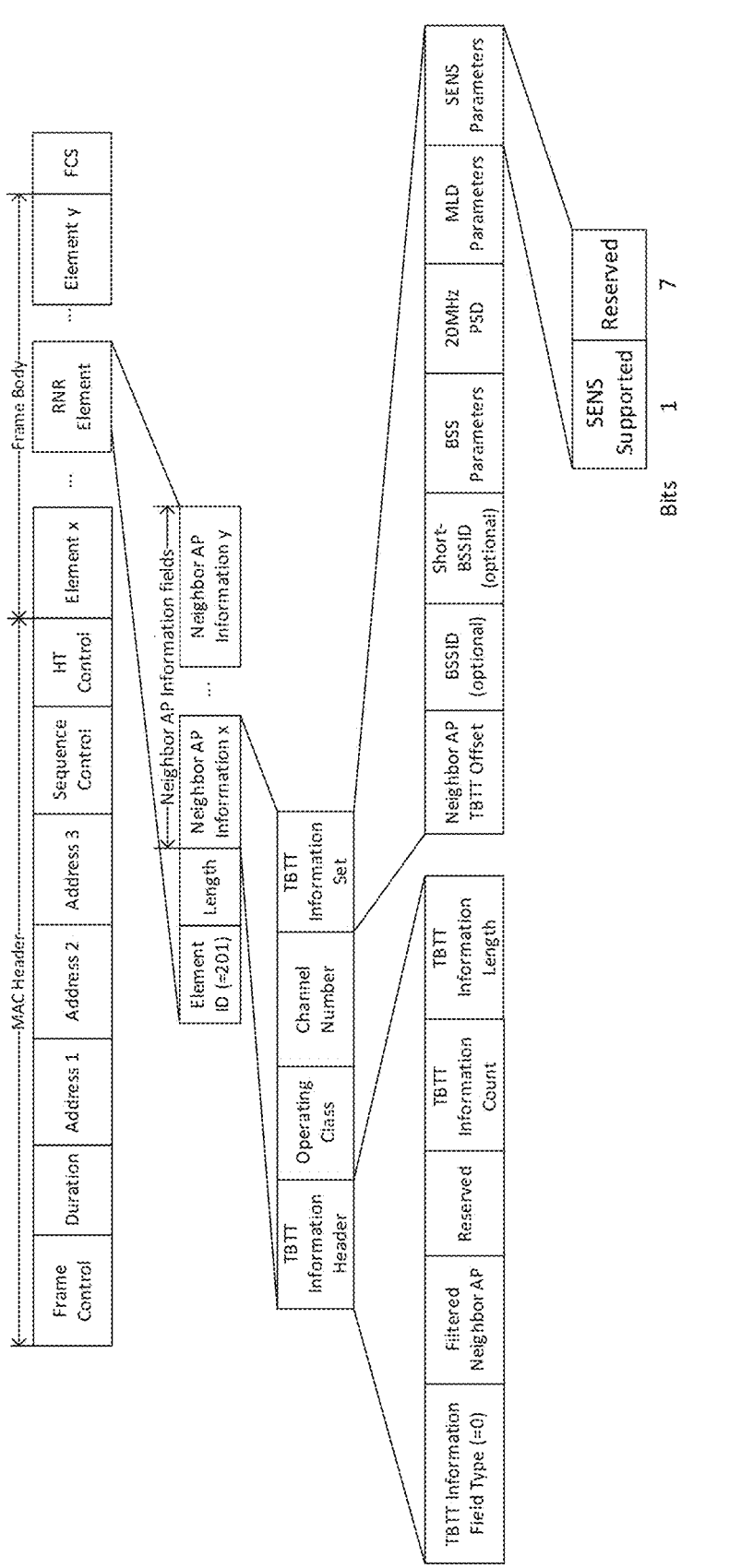

FIG. 11 is a schematic diagram illustrating an example of an indication of a reported AP in an RNR element according to an embodiment of the present disclosure.

Figure 12:
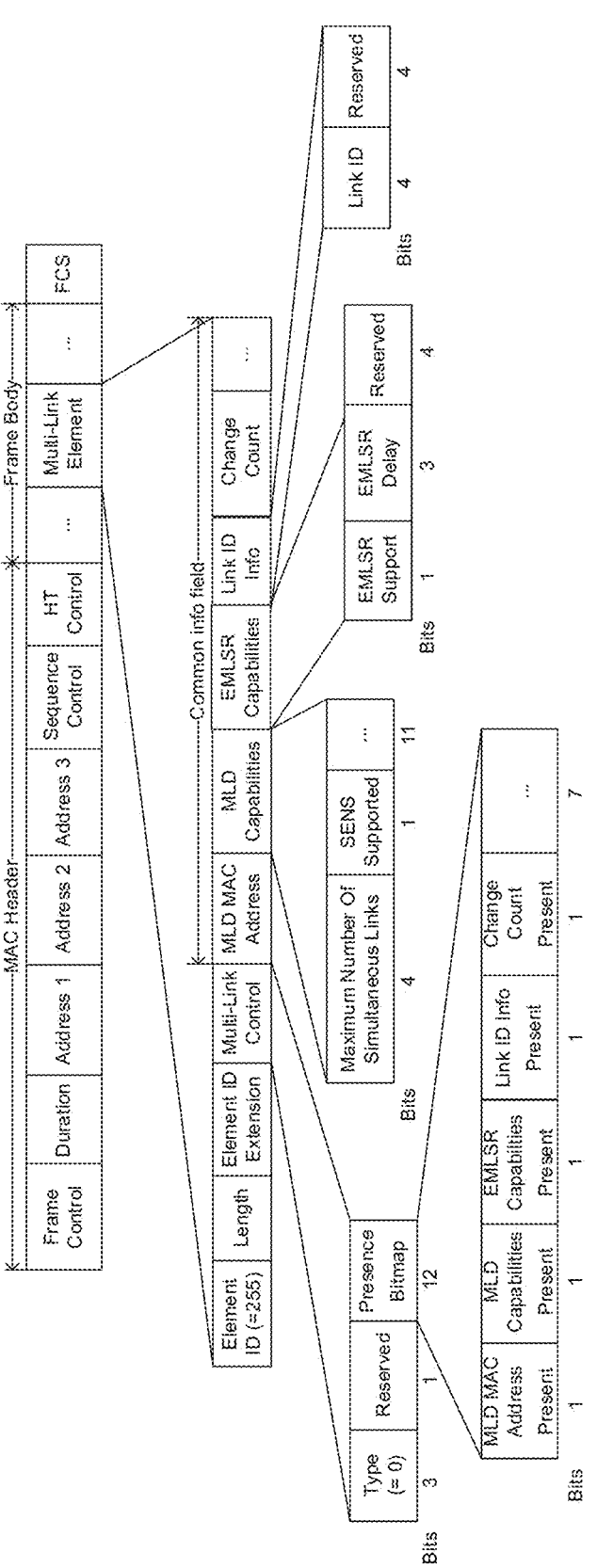

FIG. 12 is a schematic diagram illustrating an example of an indication of an AP multi-link device (MLD) in a ML element according to an embodiment of the present disclosure.

Figure 13:
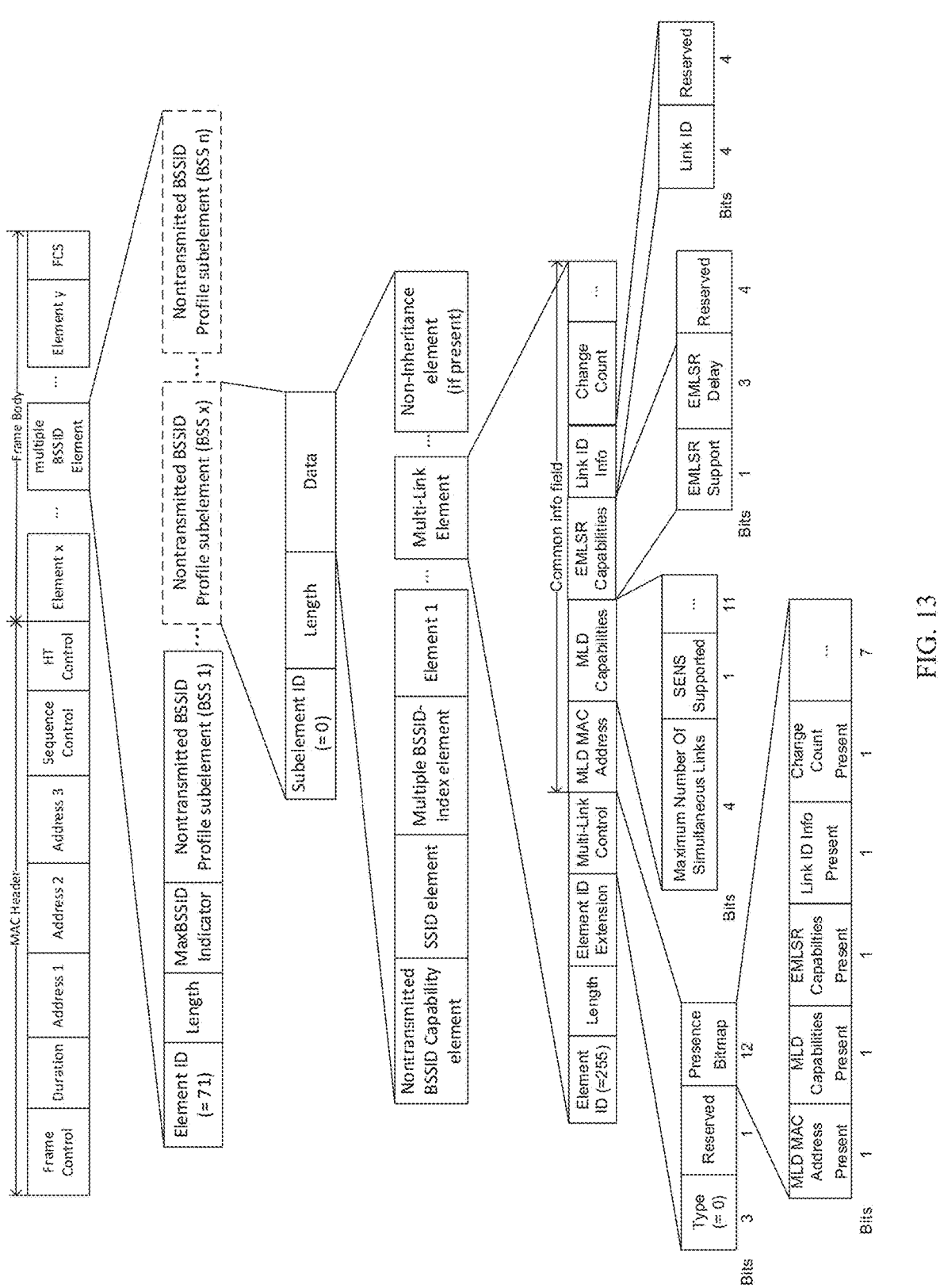

FIG. 13 is a schematic diagram illustrating an example of an indication of an AP MLD in a ML element of a non-transmitted basic service set identifier (BSSID) profile according to an embodiment of the present disclosure.

Figure 14:
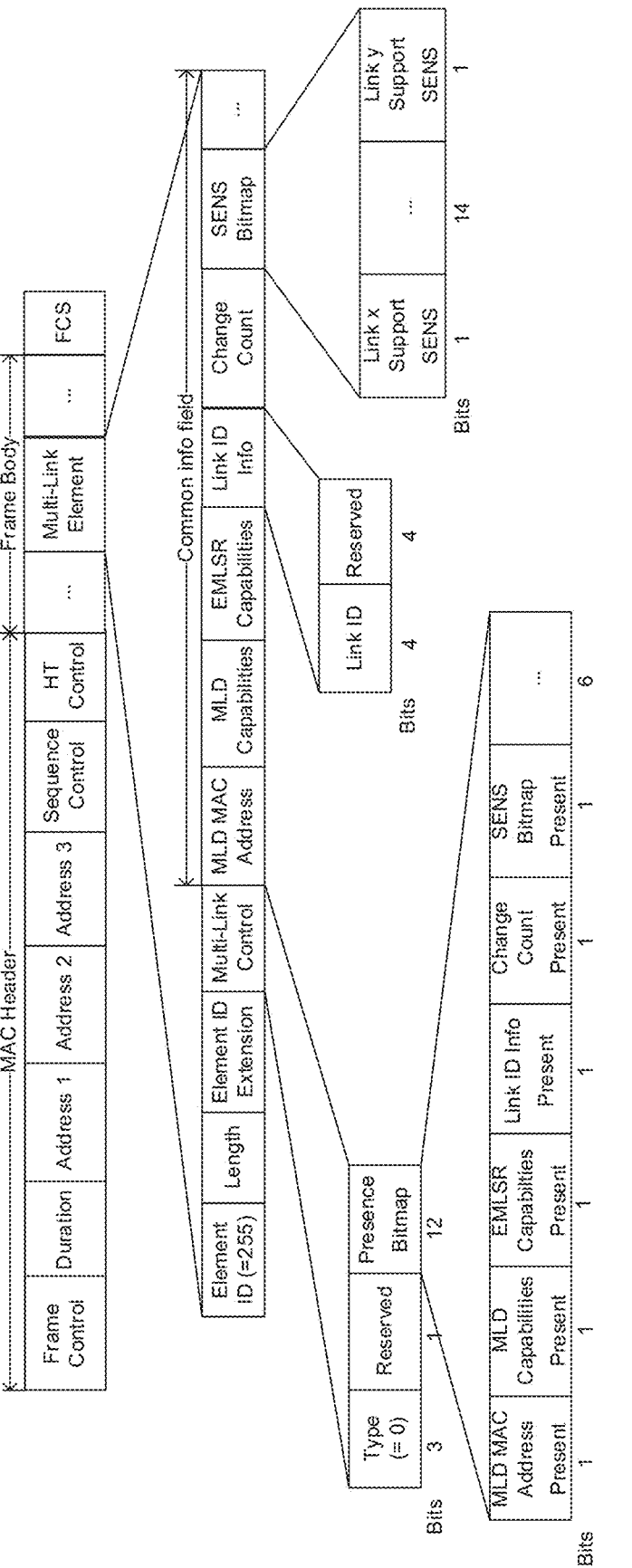

FIG. 14 is a schematic diagram illustrating an example of an indication of APs in an AP MLD in a ML element according to an embodiment of the present disclosure.

Figure 15:
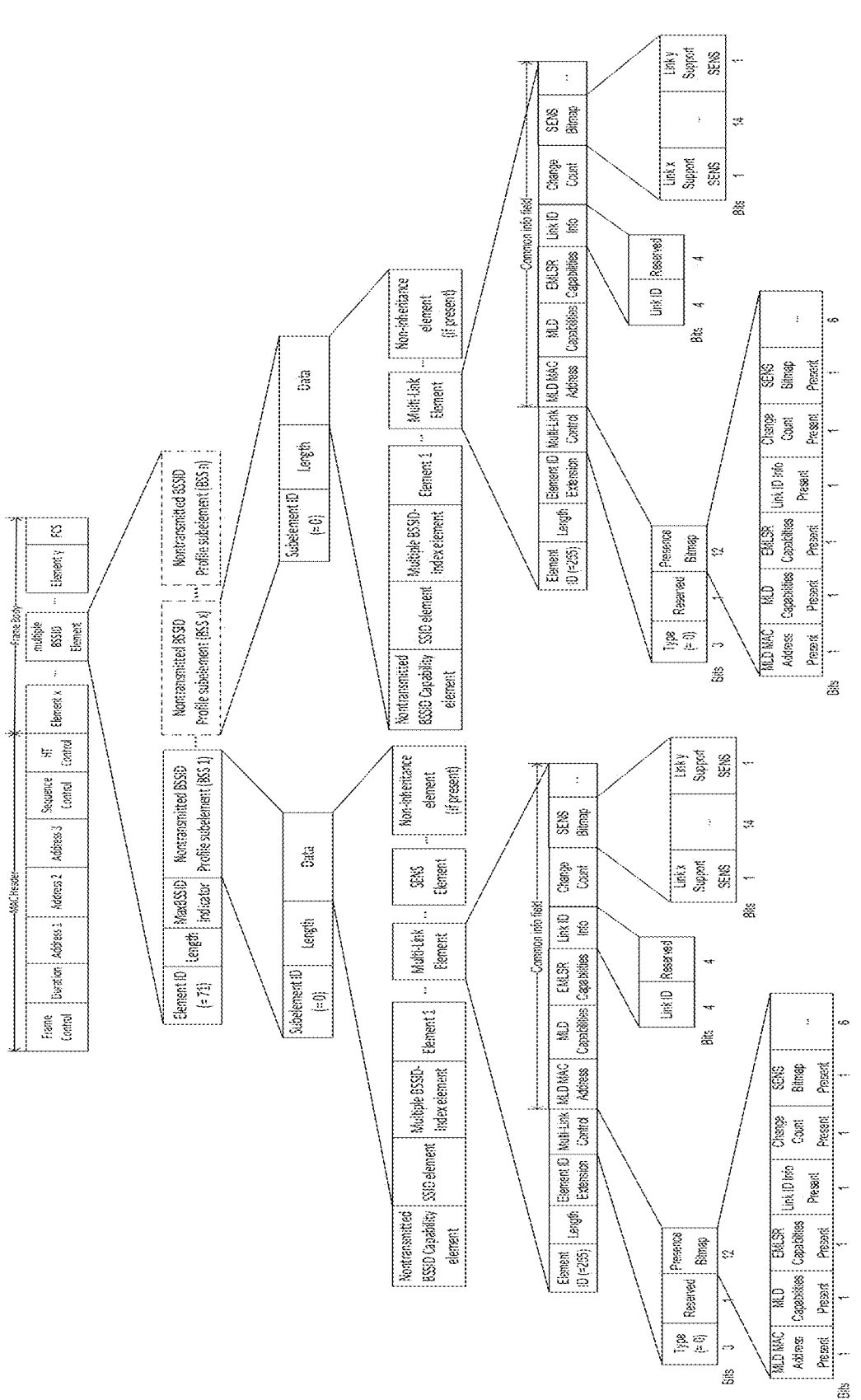

FIG. 15 is a schematic diagram illustrating an example of an indication of APs in an AP MLD in a ML element of a non-transmitted BSSID profile according to an embodiment of the present disclosure.

Figure 16:
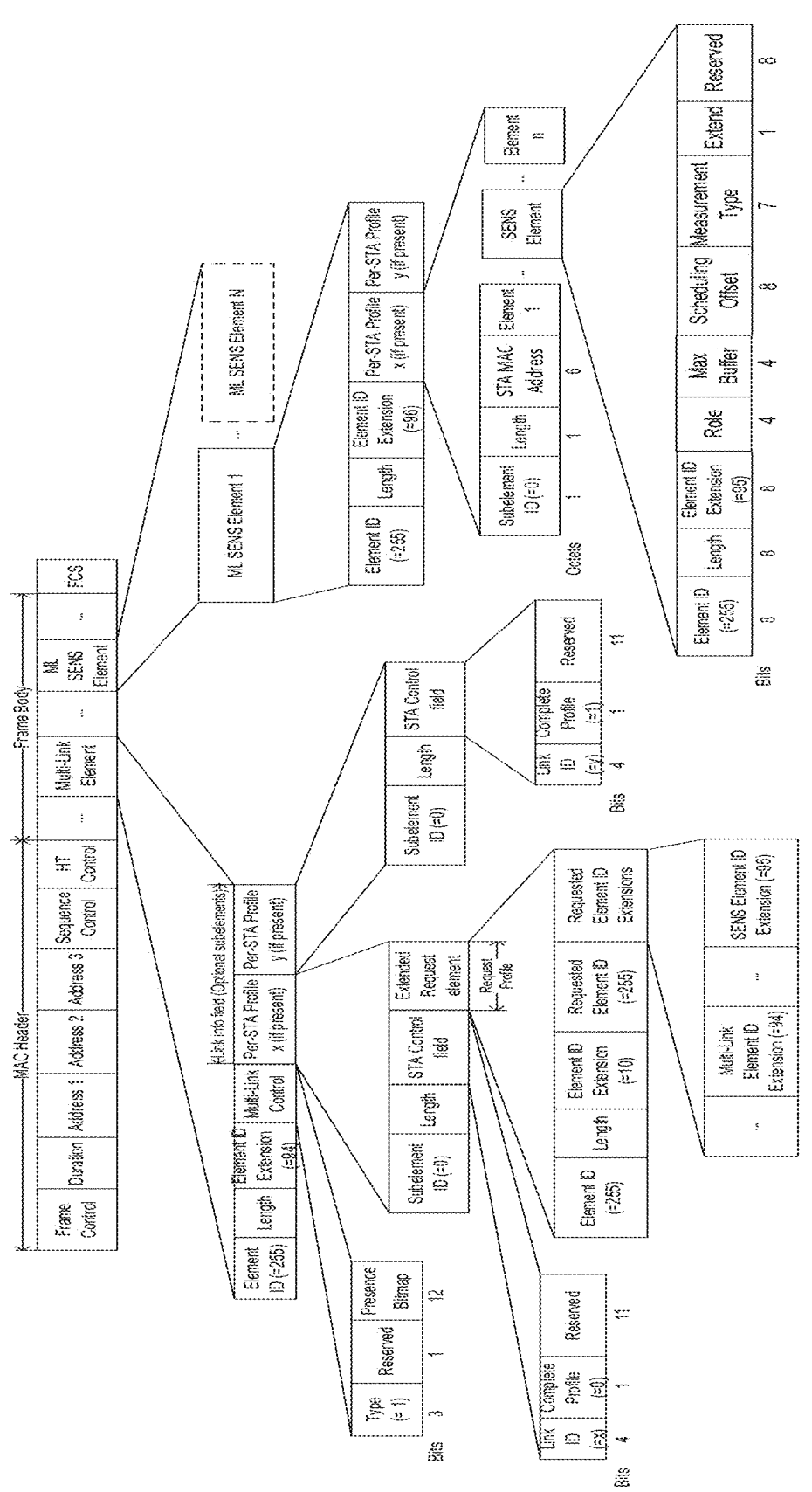

FIG. 16 is a schematic diagram illustrating an example of a non-AP STA carrying sensing capabilities of a non-AP MLD according to an embodiment of the present disclosure.

Figure 17:
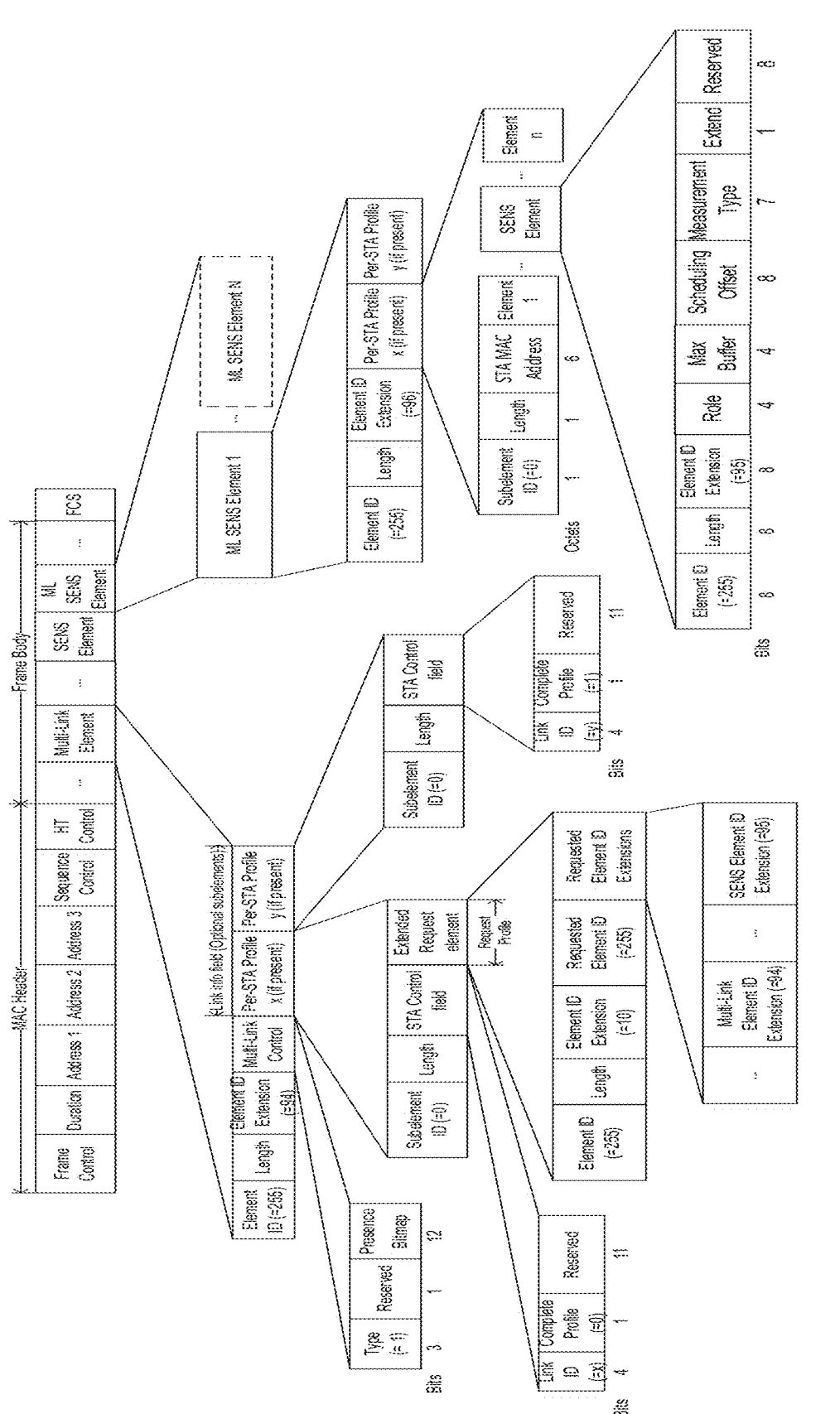

FIG. 17 is a schematic diagram illustrating an example of a non-AP STA carrying sensing capabilities of a non-AP MLD according to an embodiment of the present disclosure.

Figure 18:
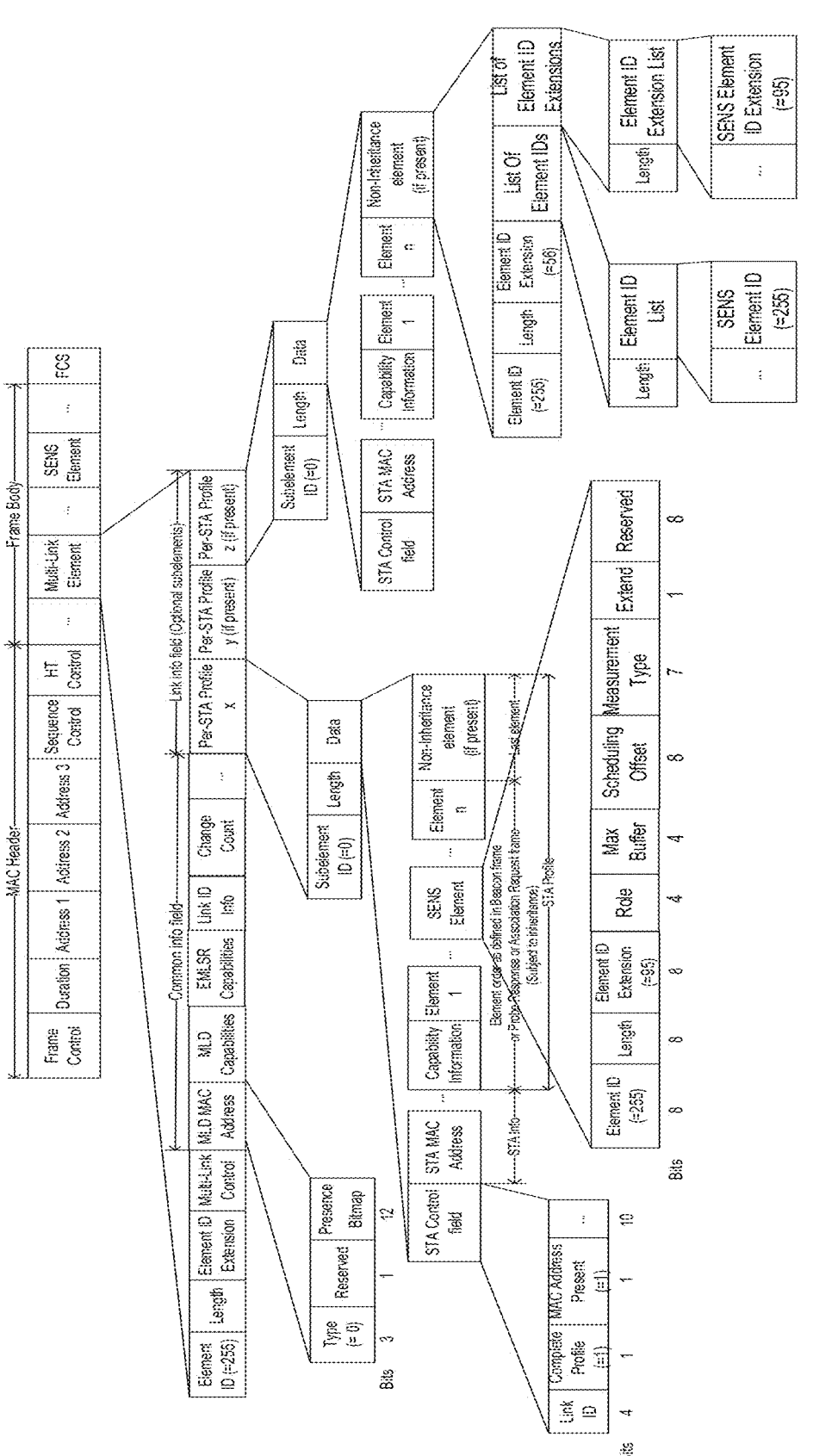

FIG. 18 is a schematic diagram illustrating an example of a reporting AP supporting sensing according to an embodiment of the present disclosure.

Figure 19:
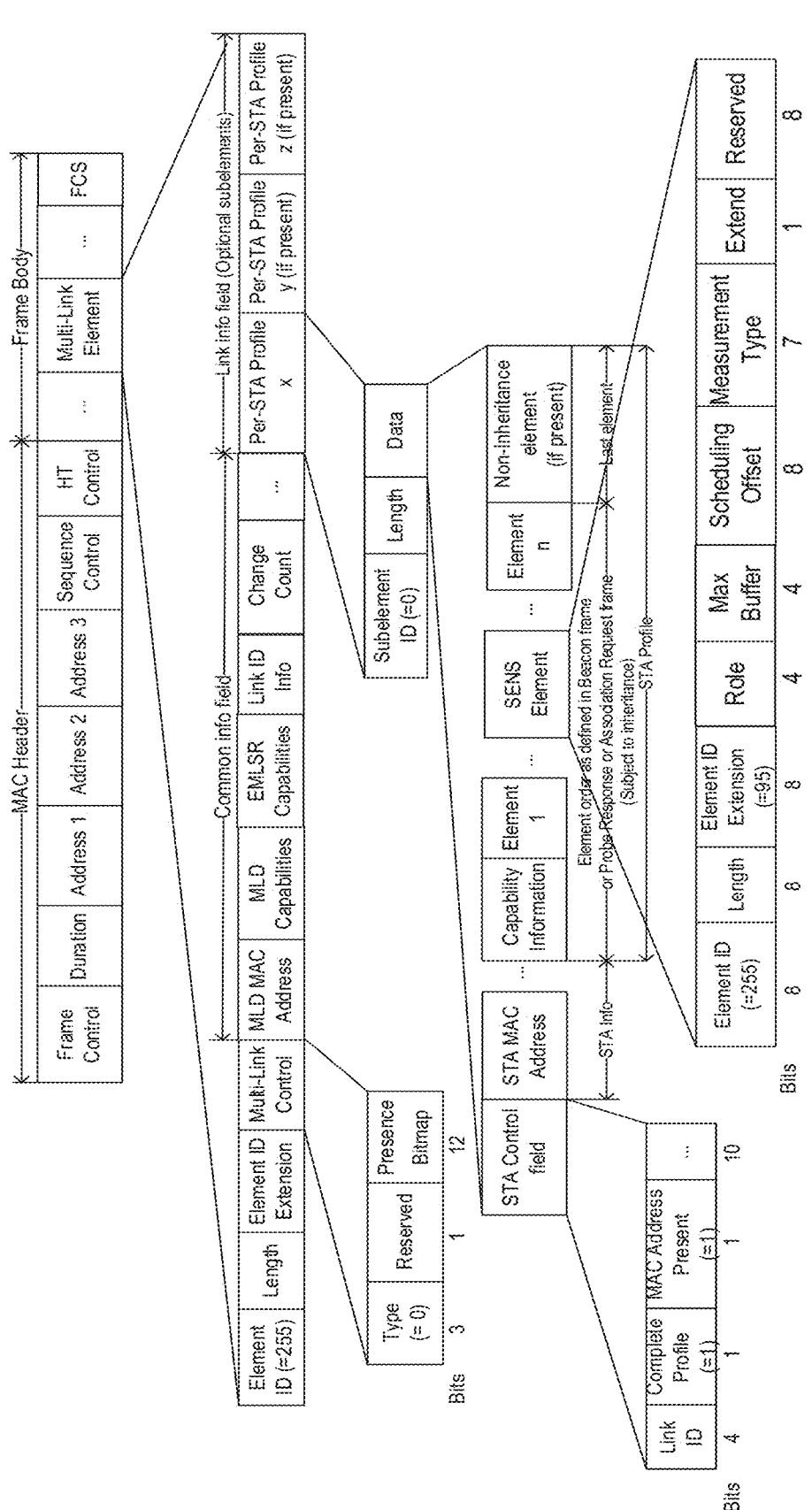

FIG. 19 is a schematic diagram illustrating an example of a reporting AP not supporting sensing according to an embodiment of the present disclosure.

Figure 20:
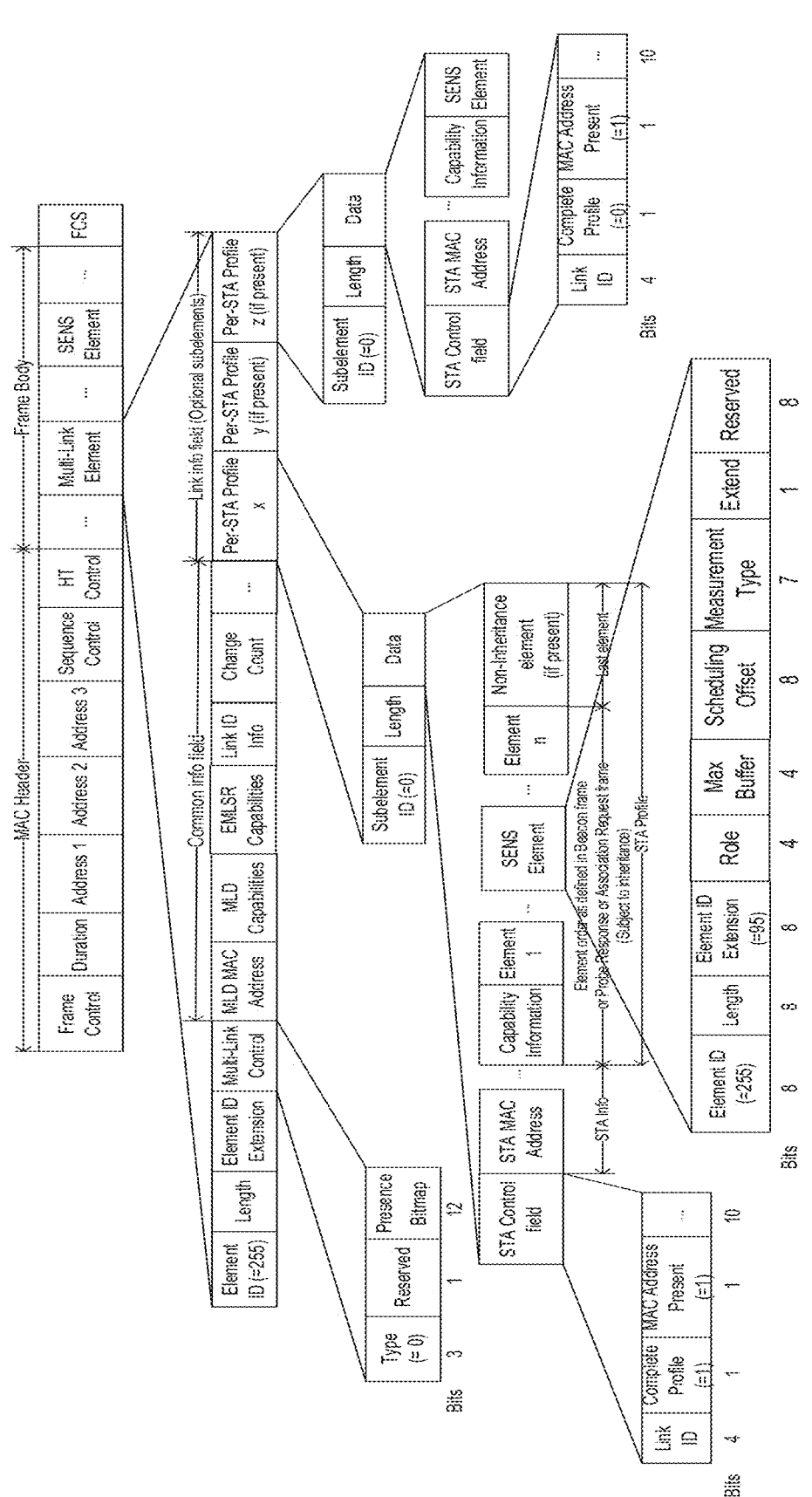

FIG. 20 is a schematic diagram illustrating an example of a partial information of an AP according to an embodiment of the present disclosure.

Figure 21:
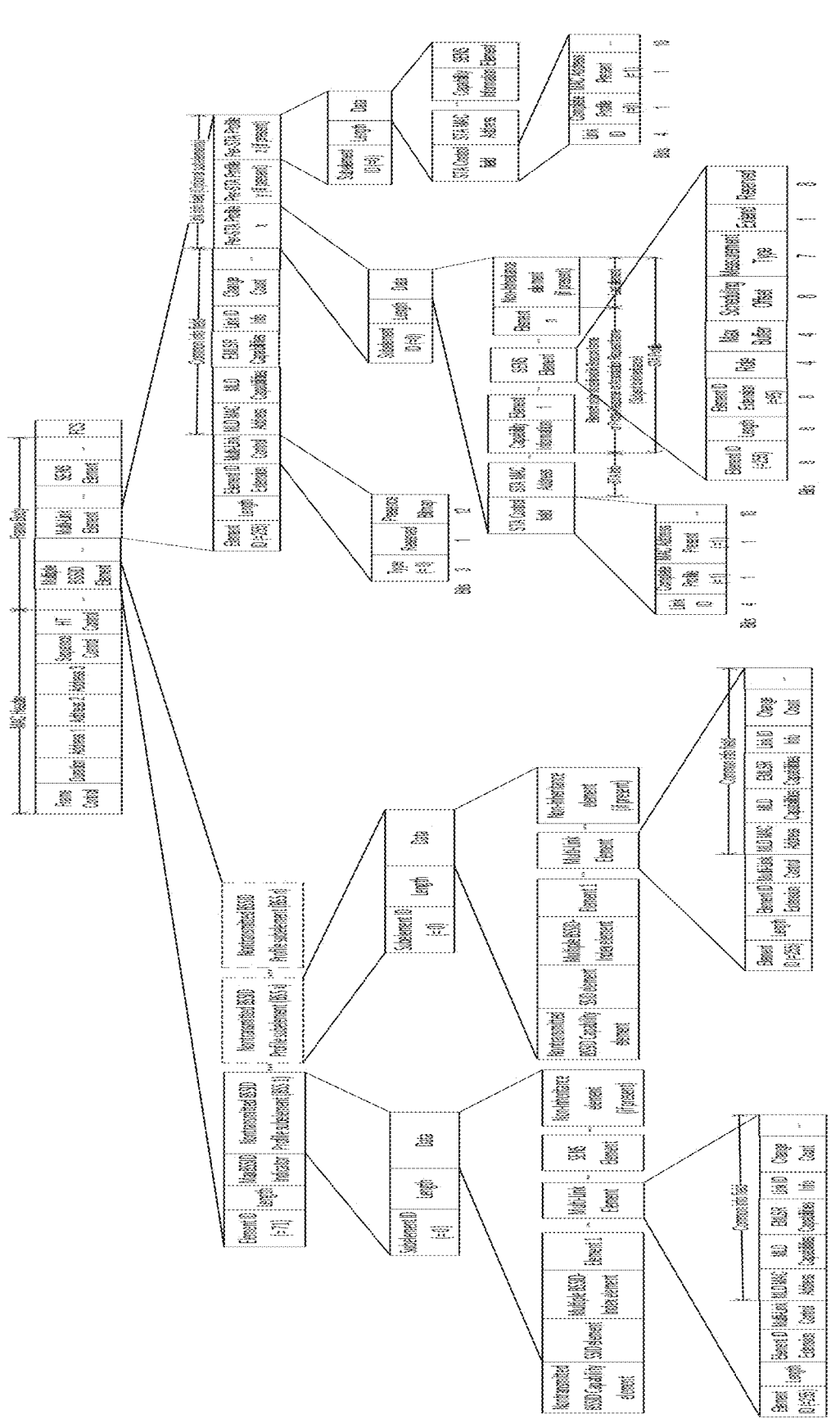

FIG. 21 is a schematic diagram illustrating an example of a response frame of a transmitted BSSID according to an embodiment of the present disclosure.

Figure 22:
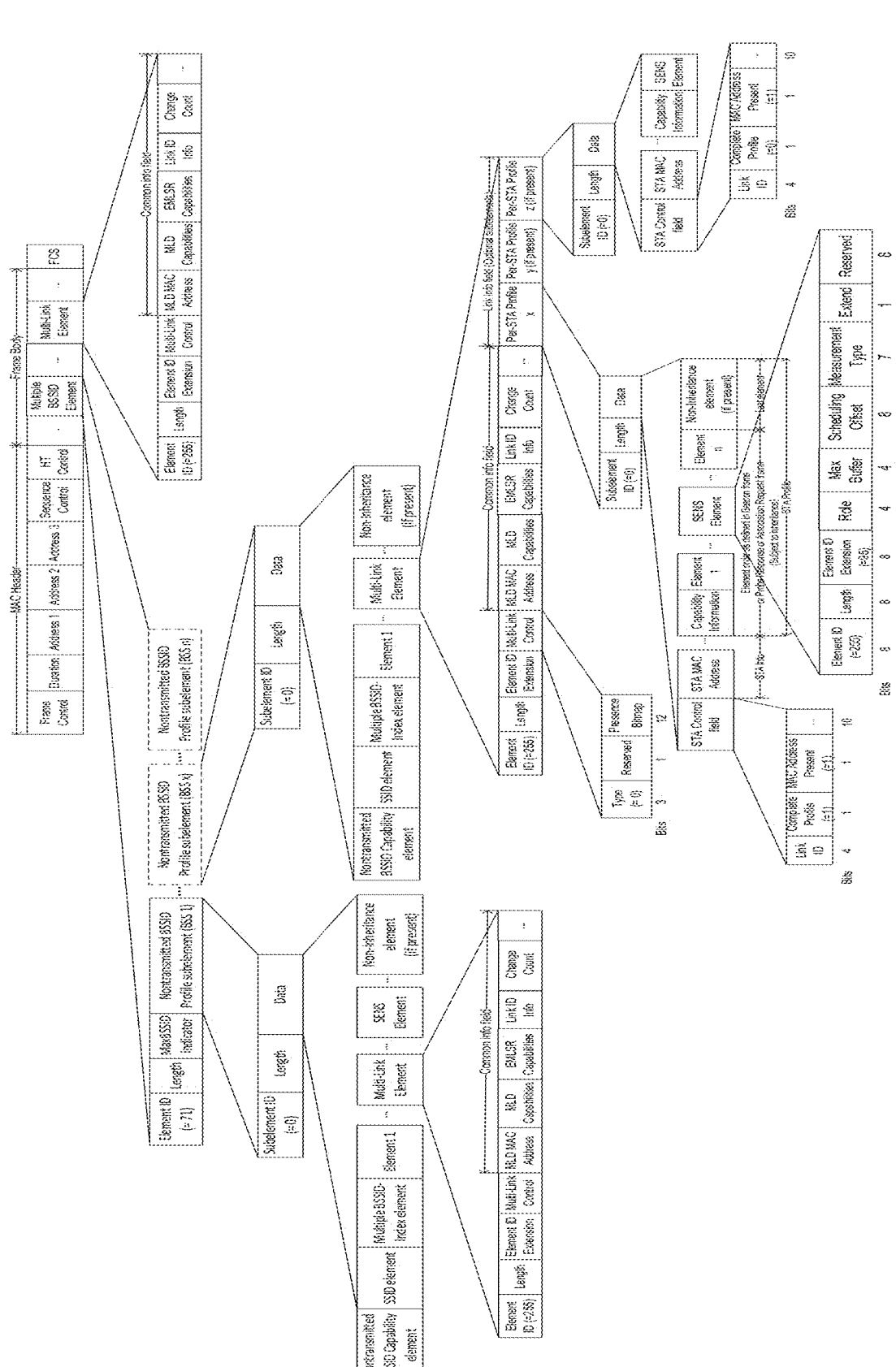

FIG. 22 is a schematic diagram illustrating an example of a response frame of a non-transmitted BSSID according to an embodiment of the present disclosure.

Figure 23:
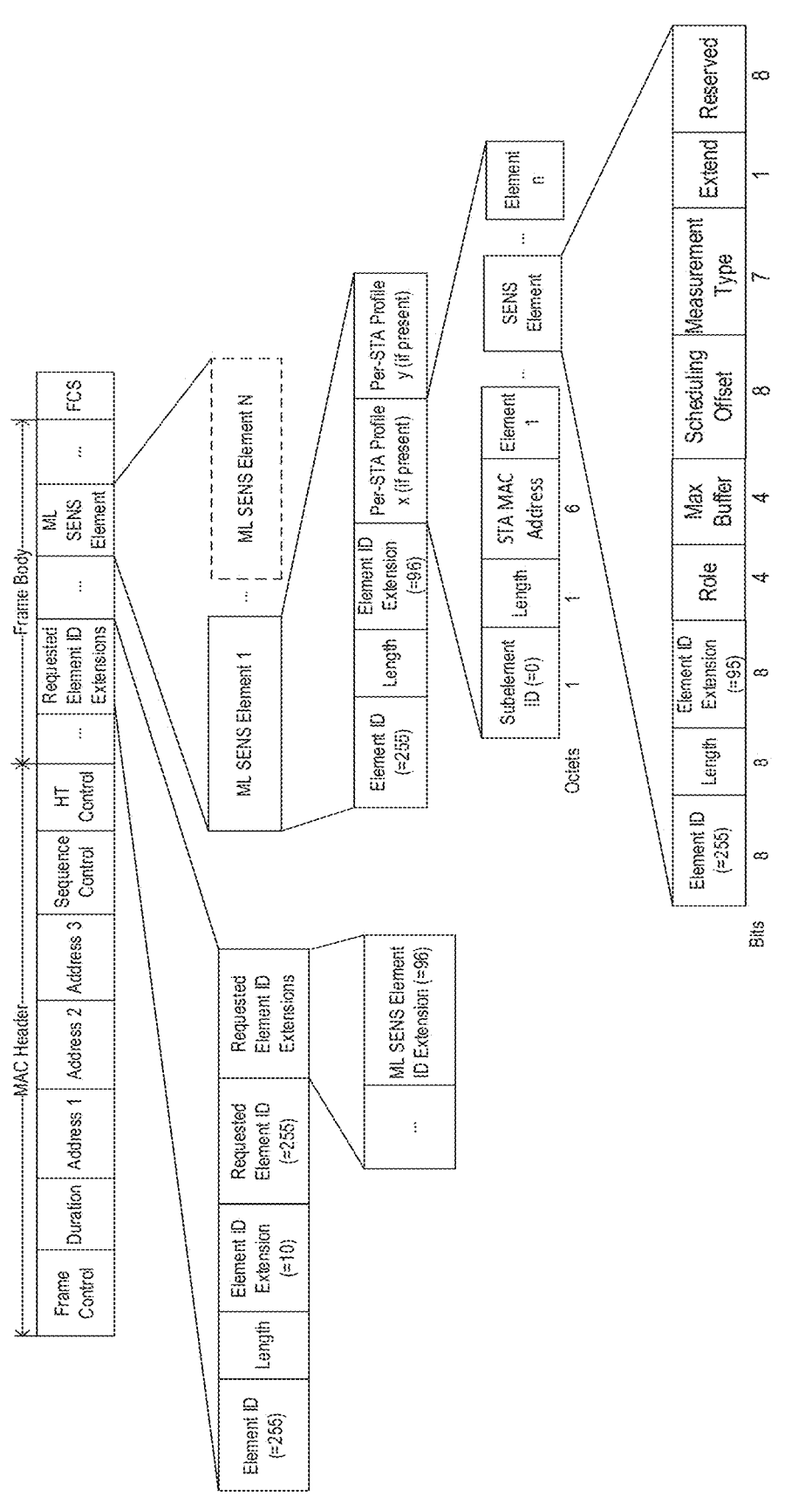

FIG. 23 is a schematic diagram illustrating an example of a non-AP STA carrying sensing capabilities of a non-AP MLD according to an embodiment of the present disclosure.

Figure 24:
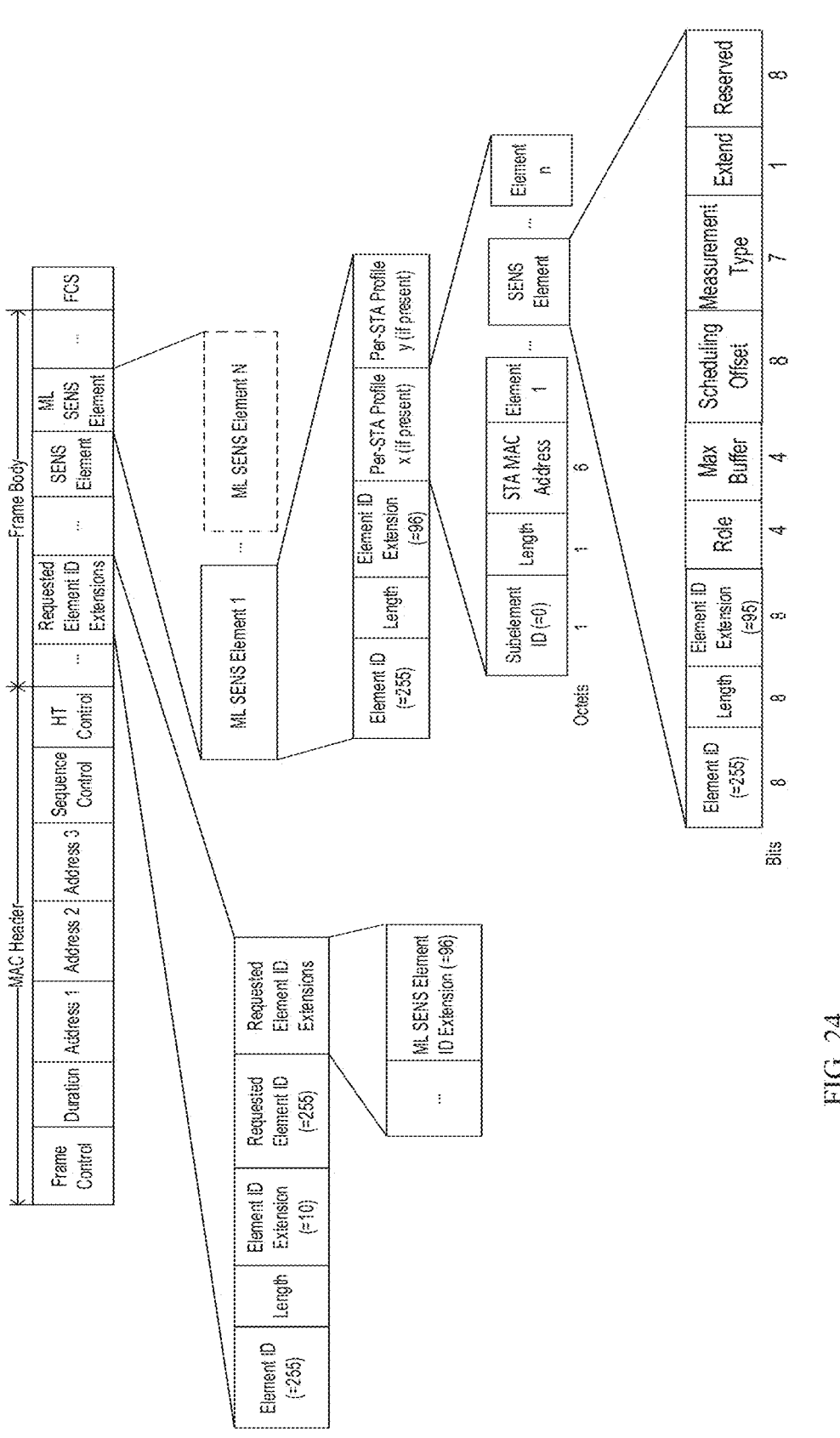

FIG. 24 is a schematic diagram illustrating an example of a non-AP STA carrying sensing capabilities of a MLD according to an embodiment of the present disclosure.

Figure 25:
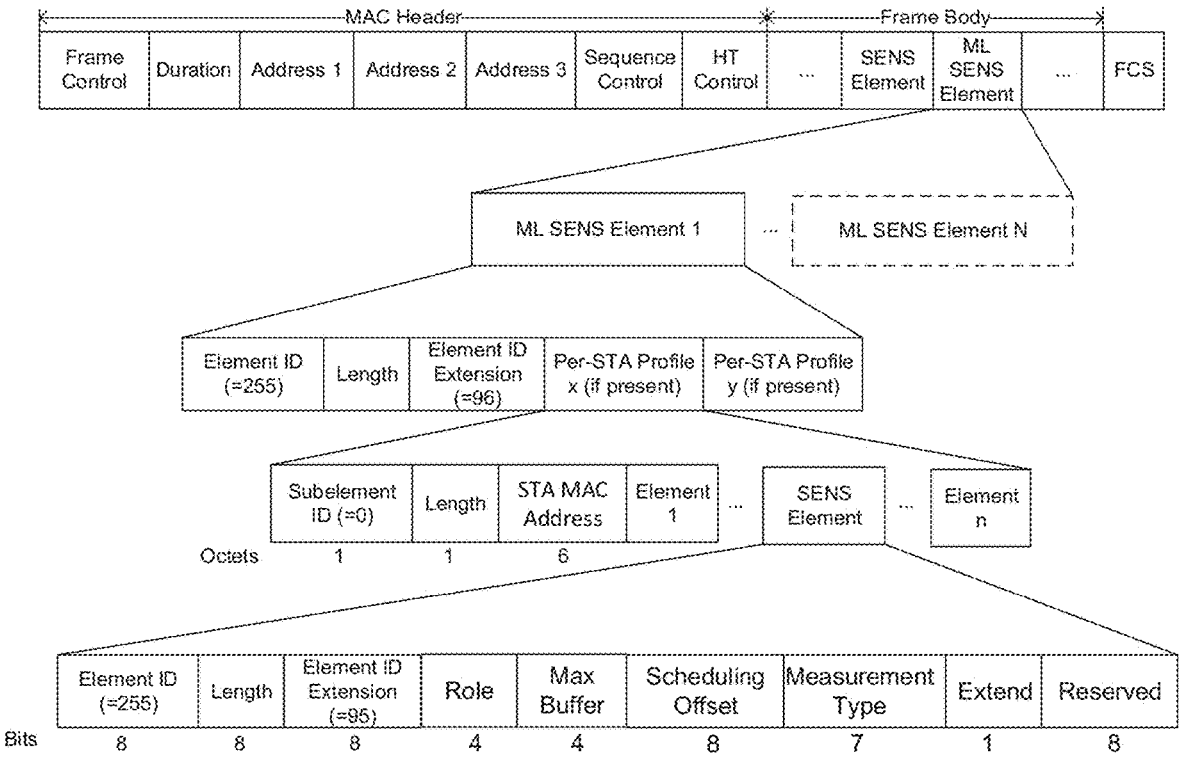

FIG. 25 is a schematic diagram illustrating an example of an AP carrying sensing capabilities of multiple APs according to an embodiment of the present disclosure.

Figure 26:
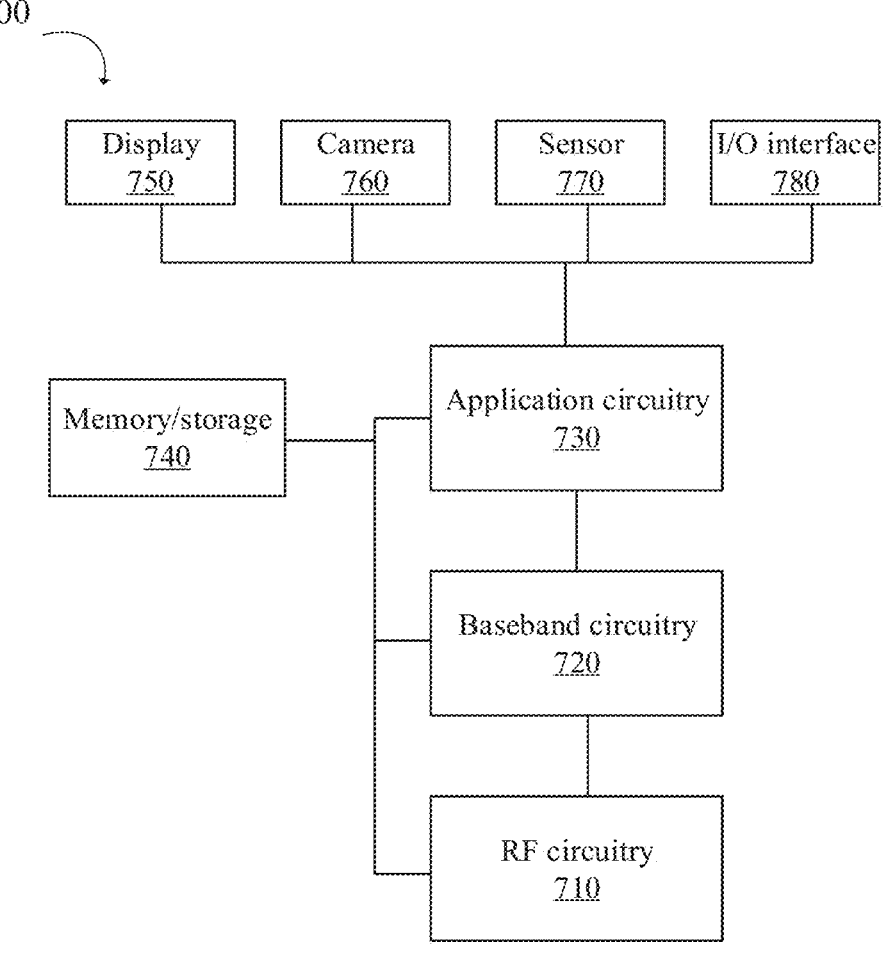

FIG. 26 is a block diagram of a system for wireless communication according to an embodiment of the present disclosure.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
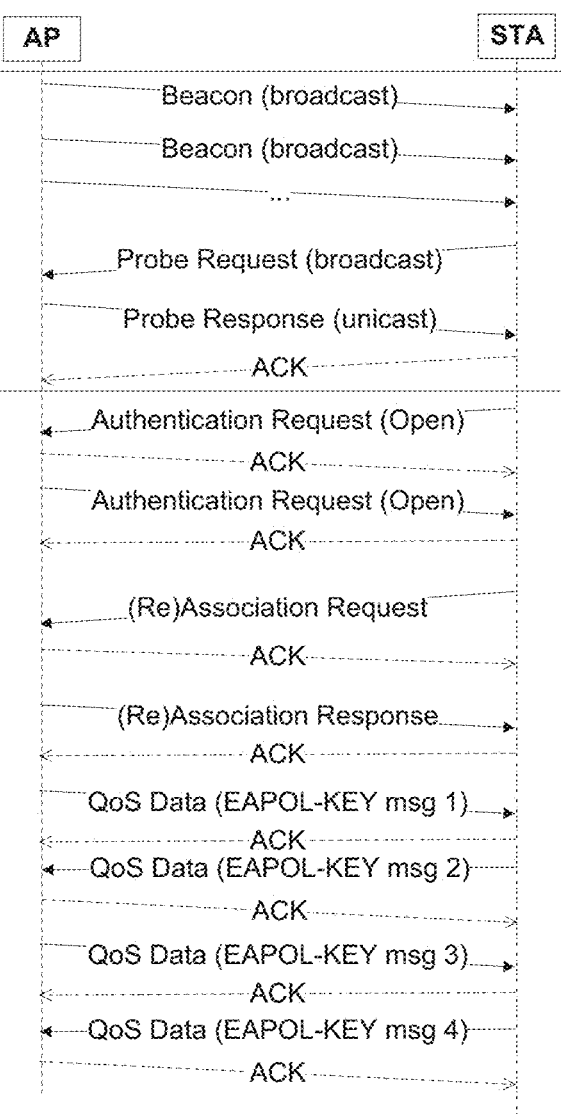
FIG. 1 is a schematic diagram illustrating an example of a general sensing discovery procedure.

FIG. 1 illustrates an example of a general sensing discovery procedure. FIG. 1 illustrates that, in some embodiments, a general sensing discovery procedure is provided. In the general sensing discovery procedure, a legacy access point (AP) may advertise its sensing capabilities in beacon or probe response frames. A legacy non-AP station (STA) may advertise its sensing capabilities in probe request frames. Sensing capabilities may comprises information such as at least one of the followings. 1. Role capabilities: initiator, responder, transmitter, receiver, or processor. 2. Measurement type: channel state information (CSI), compressed beamforming, beam signal-to-noise ratio (SNR), . . . , etc. 3. Band capabilities: frequency bands capable for sensing. 4. Buffer capabilities: number of measurement results buffered before reporting. 5. Scheduling capabilities: pre-determined sensing session timing information.

Figures 2, 3:
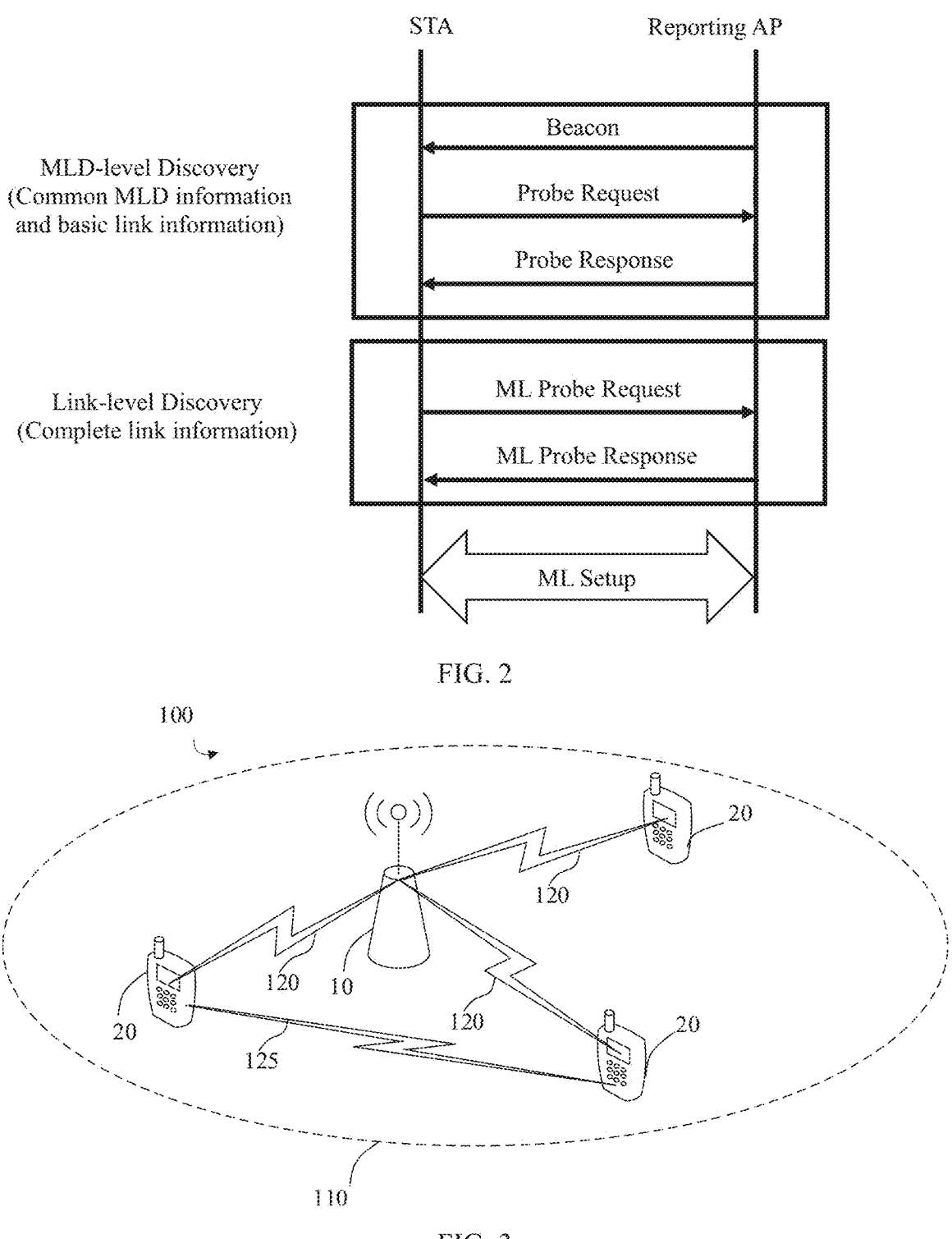
FIG. 2 is a schematic diagram illustrating an example of a multi-link (ML) discovery procedure.
FIG. 3 is a schematic diagram illustrating an example of a wireless communications system according to an embodiment of the present disclosure.

FIG. 2 is a schematic diagram illustrating an example of a multi-link (ML) discovery procedure. FIG. 2 illustrates that, in some embodiments, multi-link (ML) discovery procedure comprises a multi-link device (MLD)-level discovery and a link-level discovery. In the MLD-level discovery, a beacon or probe response frame, which carries a common MLD information and a basic link information, transmitted by a reporting AP affiliated with an AP MLD, may comprise a basic variant ML element, multiple basic service set identifier (BSSID) element (may comprises a basic variant multi-link element), or a reduced neighbor report (RNR) element. In the link-level discovery, ML probe request frame, which requests complete or partial information for each requested link (AP), transmitted by a non-AP STA affiliated with a non-AP MLD, may comprise a probe request variant ML element. In the link-level discovery, ML probe response frame, which carries complete or partial information for each requested link (AP), transmitted by a reporting AP affiliated with an AP MLD, may comprise a basic variant ML element.

The following description is directed to certain implementations for the purposes of describing the innovative aspects of the present disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the IEEE 802.11 standards, the Bluetooth® standard, code division multiple access (CDMA), frequency division multiple access (FDMA), time division multiple access (TDMA), global system for mobile communications (GSM), GSM/general packet radio service (GPRS), enhanced data GSM environment (EDGE), terrestrial trunked radio (TETRA), wideband-CDMA (W-CDMA), evolution data optimized (EV-DO), 1×EV-DO, EV-DO Rev A, EV-DO Rev B, high speed packet access (HSPA), high speed downlink packet access (HSDPA), high speed uplink packet access (HSUPA), evolved high speed packet access (HSPA+), long term evolution (LTE), AMPS, or other known signals that are used to communicate within a wireless, cellular or internet of things (IOT) network, such as a system utilizing 3G, 4G, or 5G, or further implementations thereof, technology.

FIG. 3 illustrates an example of a wireless communications system according to an embodiment of the present disclosure. The wireless communications system may be an example of a wireless local area network (WLAN) 100 (also known as a Wi-Fi network) (such as next generation, next big thing (NBT), ultra-high throughput (UHT) or EHT Wi-Fi network) configured in accordance with various aspects of the present disclosure. As described herein, the terms next generation, NBT, UHT, and EHT may be considered synonymous and may each correspond to a Wi-Fi network supporting a high volume of space-time-streams. The WLAN 100 may include an AP 10 and multiple associated STAs 20, which may represent devices such as mobile stations, personal digital assistant (PDAs), other handheld devices, netbooks, notebook computers, tablet computers, laptops, display devices (such as TVs, computer monitors, etc.) printers, etc. The AP and the associated stations 20 may represent a basic service set (BSS) or an extended service set (ESS). The various STAs 20 in the network can communicate with one another through the AP Also illustrated is a coverage area 110 of the AP 10, which may represent a basic service area (BSA) of the WLAN 100. An extended network station (not shown) associated with the WLAN 100 may be connected to a wired or wireless distribution system that may allow multiple APs 10 to be connected in an ESS.

In some embodiments, a STA 20 may be located in the intersection of more than one coverage area 110 and may associate with more than one AP 10. A single AP 10 and an associated set of STAs 20 may be referred to as a BSS. An ESS is a set of connected BSSs. A distribution system (not shown) may be used to connect APs 10 in an ESS. In some cases, the coverage area 110 of an AP 10 may be divided into sectors (also not shown). The WLAN 100 may include APs of different types (such as a metropolitan area, home network, etc.), with varying and overlapping coverage areas 110. Two STAs 20 also may communicate directly via a direct wireless link 125 regardless of whether both STAs 20 are in the same coverage area 110. Examples of direct wireless links 120 may include Wi-Fi direct connections, Wi-Fi tunneled direct link setup (TDLS) links, and other group connections. STAs 20 and APs 10 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11ay, etc. In some other implementations, peer-to-peer connections or ad hoc networks may be implemented within the WLAN 100.

FIG. 4 illustrates one or more stations (STAs) 20 and an access point (AP) 10 of communication in a wireless communications system 700 according to an embodiment of the present disclosure. FIG. 4 illustrates that, the wireless communications system 700 includes an access point (AP) 10 and one or more stations (STAs) 20. The AP 10 may include a memory 12, a transceiver 13, and a processor 11 coupled to the memory 12, the transceiver 13. The one or more STAs 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to perform a first sensing discovery and a second sensing discovery which are integrated or independent with a multilink discovery, wherein in the first sensing discovery, the transceiver 13 transmits, to the STA 20, essential sensing capabilities of the reporting AP (denoted as AP 10) and/or one or more reported APs (neighboring APs, not denoted in the drawings), and in the second sensing discovery, the transceiver 13 of the AP 10 transmits, to the STA 20, complete sensing capabilities of the reporting AP and/or the one or more reported APs. The reporting AP may refer to an AP that is transmitting a frame. The reported AP may refer to an AP whose information is carried in a frame transmitted by the reporting AP. This can solve issues in the prior art, provide sensing discovery including multi-link device-level (MLD-level) discovery and/or link-level discovery, achieve extremely high throughput, provide good communication performance, and/or provide high reliability.

In some embodiments, the processor 21 is configured to perform a first sensing discovery and a second sensing discovery which are integrated or independent with a multilink discovery, wherein in the first sensing discovery, the transceiver 23 of the STA 20 receives, from an AP 10, essential sensing capabilities of the reporting AP and/or one or more reported APs, and in the second sensing discovery, the transceiver 23 of the STA 20 receives, from the AP 10, complete sensing capabilities of the reporting AP and/or the one or more reported APs. The reporting AP may refer to an AP that is transmitting a frame. The reported AP may refer to an AP whose information is carried in a frame transmitted by the reporting AP. This can solve issues in the prior art, provide sensing discovery including multi-link device-level (MLD-level) discovery and/or link-level discovery, achieve extremely high throughput, provide good communication performance, and/or provide high reliability.

FIG. 5 illustrates a wireless communication method 800 performed by an AP according to an embodiment of the present disclosure. In some embodiments, the method 800 includes: a block 802, performing, by an access point (AP), a first sensing discovery and a second sensing discovery which are integrated or independent with a multilink discovery, wherein in the first sensing discovery, the AP transmits, to a station (STA), essential sensing capabilities of the reporting AP and/or one or more reported APs, and in the second sensing discovery, the AP transmits, to the STA, complete sensing capabilities of the reporting AP and/or the one or more reported APs. This can solve issues in the prior art, provide sensing discovery including multi-link device-level (MLD-level) discovery and/or link-level discovery, achieve extremely high throughput, provide good communication performance, and/or provide high reliability.

FIG. 6 illustrates a wireless communication method 900 performed by a STA according to an embodiment of the present disclosure. In some embodiments, the method 900 includes: a block 902, performing, by a station (STA), a first sensing discovery and a second sensing discovery which are integrated or independent with a multilink discovery, wherein in the first sensing discovery, the STA receives, from an access point (AP), essential sensing capabilities of the reporting AP and/or one or more reported APs, and in the second sensing discovery, the STA receives, from the AP, complete sensing capabilities of the reporting AP and/or the one or more reported APs. This can solve issues in the prior art, provide sensing discovery including multi-link device-level (MLD-level) discovery and/or link-level discovery, achieve extremely high throughput, provide good communication performance, and/or provide high reliability.

In some embodiments, the first sensing discovery comprises a multi-link device (MLD)-level discovery, and in the MLD-level discovery, the STA 20 receives, from the AP 10, a beacon frame and/or a probe response frame carrying the essential sensing capabilities of the reporting AP and/or the one or more reported APs. In some embodiments, the essential sensing capabilities of the reporting AP and/or the one or more reported APs comprise an indication on whether the AP or the AP MLD with which the AP 10 is affiliated supports sensing or not. In some embodiments, the indication comprises an AP level or a MLD level. In some embodiments, the indication comprising the MLD level is in a priority list. In some embodiments, in the MLD-level discovery, the reporting AP carries a sensing supported subfield to indicate whether the reporting AP supports sensing or not; and/or the reporting AP carries the sensing supported subfield for the one or more reported APs in a reduced neighbor report (RNR) element. In some embodiments, in the MLD-level discovery, the reporting AP carries a sensing supported subfield to indicate whether the AP MLD, with which the reporting AP is affiliated, supports sensing or not; and/or the reporting AP carries the indication in a basic variant ML element and/or the basic variant ML element contained in a multiple basic service set identifier (BSSID) element; and/or the reporting AP carries a modified target beacon transmission time (TBTT) information set for the one or more reported APs in a RNR element.

In some embodiments, the reporting AP is corresponding to a transmitted BSSID in the multiple BSSID element and the reporting AP is affiliated with the AP MLD. In some embodiments, the reporting AP is corresponding to a transmitted BSSID in the multiple BSSID element and the reporting AP is not affiliated with the AP MLD. In some embodiments, in the MLD-level discovery, the reporting AP carries a bitmap subfield to indicate whether the APs, which is affiliated with the same AP MLD as the reporting AP, supports sensing or not. In some embodiments, the second sensing discovery comprises a link-level discovery, and in the link-level discovery, the AP 10 receives, from the STA 20, a multi-link (ML) probe request frame carrying STA sensing capabilities of a non-AP MLD with which the STA 20 is affiliated. In some embodiments, in the link-level discovery, the AP 10 receives, from the STA 20, one or more ML probe request frames for different AP MLDs cached in the priority list. In some embodiments, the AP 10 carries the complete sensing capabilities of the reporting AP and/or the one or more reported APs in a ML probe response. In some embodiments, the reporting AP and/or the one or more reported APs comprise the AP, whose link identifier (ID) is equal to a value in a link ID in a per-STA profile subelement in a probe request variant ML element in the ML probe request frame.

In some embodiments, the reporting AP and/or the one or more reported APs comprise the APs which are affiliated with the same MLD of the AP as specified in the ML probe request frame, or the APs that the reporting AP knows when the probe request variant ML element in the ML probe request frame does not comprises a per-STA profile. In some embodiments, in the link-level discovery, the non-AP STA carries per STA sensing capabilities of the non-AP MLD with which the non-AP STA is affiliated in a ML probe request. In some embodiments, in the link-level discovery, the AP 10 carries complete per AP sensing capabilities in a ML probe response. In some embodiments, the second sensing discovery comprises a sensing specific discovery, and in the sensing specific discovery, a non-AP STA carries per STA sensing capabilities of the non-AP MLD with which the non-AP STA is affiliated in a sensing probe request. In some embodiments, in the sensing specific discovery, the AP 10 receives, from the non-AP STA, one or more sensing probe request frames for different AP MLDs cached in a priority list. Optionally, the AP 10 may be one of the APs 10. The receiving AP for different AP MLD is different. In some embodiments, in the sensing specific discovery, the AP 10 carries complete per AP sensing capabilities in the sensing probe response frames, for requested APs.

Some embodiments of the present disclosure introduce a two-stage procedure for sensing discovery. In some embodiments, a two-stage sensing discovery procedure integrated with a multilink discovery is provided. The two-stage sensing discovery procedure integrated with the multilink discovery comprises a MLD-level discovery and a link-level discovery. In some embodiments, in the MLD-level discovery, a beacon frame and/or probe response frame carries an essential sensing capability information for a reporting AP and/or one or more reported APs. The reporting AP may refer to an AP that is transmitting a frame. The reported AP may refer to an AP whose information is carried in a frame transmitted by the reporting AP. Essential sensing capability information may comprise an indication on whether an AP or an AP MLD supports sensing or not. The indication may be AP level (indication for a single AP, set to 1 if a corresponding AP supports sensing, set to 0 otherwise.) or MLD level (an indication for a whole AP MLD, that is: set to 1 if at least one out of APs affiliated with the AP MLD supports sensing; set to 0 if none of the APs affiliated with the AP MLD supports sensing). The non-AP STA may cache the received AP MLDs' information in a priority list (e.g. AP supporting sensing has a higher priority or reporting higher received signal strength indicator (RSSI) has a higher priority, etc.). In some embodiments, in the link-level discovery, a ML probe request frame may carry per STA sensing capabilities of a non-AP MLD with which a requesting non-AP STA is affiliated. The non-AP STA may transmit one or more ML probe request frames for different AP MLDs cached in the above stage, based on the priority specified. In some embodiments, the AP may carry complete per AP sensing capabilities in a ML probe response, for at least one of the followings: The requested APs as specified in the ML probe request frame, when a link ID of the AP is equal to a value in a link ID field in a Per-STA Profile subelement in a probe request variant ML element in the ML probe request frame; All APs affiliated with the same MLD as specified in the ML probe request frame or all APs that the AP 10 knows when the probe request variant ML element in the ML probe request frame does not include any per-STA profile.

Figure 7:
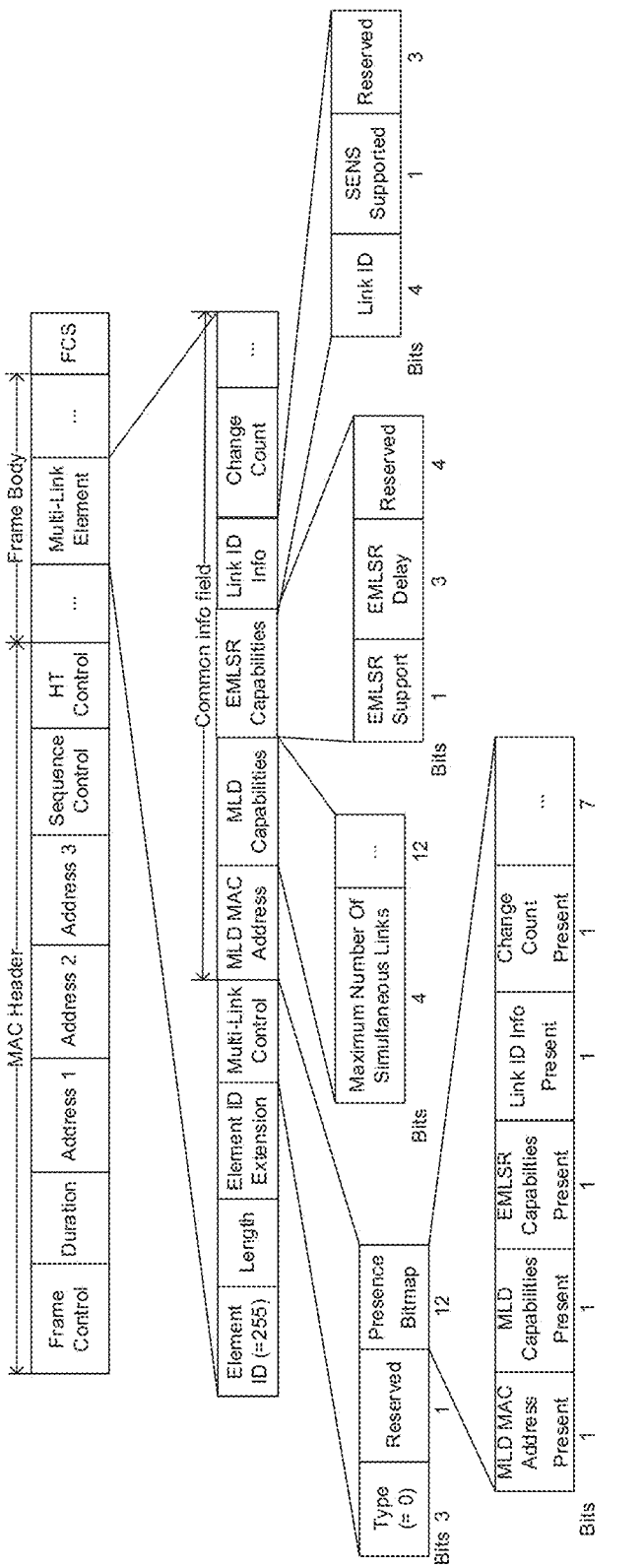
FIG. 7 is a schematic diagram illustrating an example of an indication of the reporting AP in a link identifier (ID)

Two-stage sensing discovery procedure integrated with multilink discovery:

FIG. 7 illustrates an example of an indication of the reporting AP in a link identifier (ID) information of a basic variant multi-link (ML) element according to an embodiment of the present disclosure. FIG. 8 illustrates an example of an indication of the reporting AP in a capability information field according to an embodiment of the present disclosure. FIG. 9 illustrates an example of an indication of the reporting AP in an extended capabilities element according to an embodiment of the present disclosure. FIG. 7 to FIG. 9 illustrate that, in some embodiments, in a MLD-level discovery, a reporting AP carries a SENS supported subfield (or called sensing supported subfield), to indicate whether the reporting AP supports sensing or not. In addition, FIG. 7 is applicable when the reporting AP is affiliated with an AP MLD. It uses 1 of the 4 reserved bits. FIG. 8 is applicable no matter the reporting AP is affiliated with an AP MLD or not. It uses one of the 6 reserved bits. FIG. 9 is applicable no matter the reporting AP is affiliated with an AP MLD or not. It adds one bit after existing bits.

FIG. 10 illustrates an example of an indication of a reported AP in a reduced neighbor report (RNR) element according to an embodiment of the present disclosure. FIG. 11 illustrates an example of an indication of a reported AP in an RNR element according to an embodiment of the present disclosure. FIG. 10 and FIG. 11 illustrate that, in some embodiments, the reporting AP carries a SENS supported subfield for each neighbor AP (or called a reported AP) in a reduced neighbor report (RNR) element. Set SENS supported bit to 1 if a corresponding AP supports sensing or set to 0 otherwise. In addition, FIG. 10 is applicable when the reported AP is affiliated with an AP MLD. It uses one of the 4 reserved bits in MLD parameters. FIG. 11 is applicable no matter the reported AP is affiliated with an AP MLD or not. It adds an SENS parameter subfield which carries an SENS supported indication. In this case, to maintain compatibility, a target beacon transmit time (TBTT) information length subfield value is set to 14 (a reserved value), and a TBTT information set contains a neighbor AP TBTT offset subfield, a BSSID subfield, a short-SSID subfield, a BSS parameter subfield, a 20 MHz physical layer service data (PSD) subfield, and a SENS parameter subfield. In some embodiments, in the MLD-level discovery, the reporting AP carries complete sensing capabilities of itself if it supports sensing (existing technology). Further, the reporting AP carries a SENS supported subfield for each neighbor AP (or called each reported AP) in a reduced neighbor report (RNR) element as illustrated in FIG. 10 or FIG. 11. Set SENS supported bit to 1 if the corresponding AP supports sensing, set to 0 otherwise.

FIG. 12 illustrates an example of an indication of an AP multi-link device (MLD) in a ML element according to an embodiment of the present disclosure. FIG. 13 illustrates an example of an indication of an AP MLD in a ML element of a non-transmitted basic service set identifier (BSSID) profile according to an embodiment of the present disclosure. In the MLD-level discovery, a reporting AP carries a SENS supported subfield, to indicate whether the AP MLD, with which the reporting AP is affiliated, supports sensing or not. The reporting AP carries this indication as specified in basic variant ML element(s) (as illustrated in FIG. 12) and/or basic variant ML element(s) contained in multiple BSSID element(s) (as illustrated in FIG. 13). The reporting AP carries modified TBTT information set (as illustrate in FIG. 11) of a reduced neighbor report (RNR) element for any other reported APs neither specified as illustrated in FIG. 12 nor FIG. 13. In addition, FIG. 12 is applicable if the reporting AP is affiliated with an AP MLD. It uses one of 12 reserved bits of MLD capabilities subfield in the basic variant ML element. In some embodiments, FIG. 13 is applicable in the following cases: Case 1, the reporting AP is corresponding to a transmitted BSSID in a multiple BSSID element and the reporting AP is affiliated with an AP MLD. The indication of the AP MLD, with which the reporting AP is affiliated, is carried as illustrated in FIG. 12. The indication of other AP MLDs, with which the corresponding AP of a non-transmitted BSSID is affiliated, is carried as illustrated in FIG. 13. Case 2, the reporting AP is corresponding to a transmitted BS SID in a multiple BS SID element and the reporting AP is not affiliated with any AP MLD. The indication of the reporting AP is carried as illustrated in FIG. 8 or FIG. 9. The indication of AP MLDs, with which the corresponding AP of a non-transmitted BSSID is affiliated, is carried as illustrated in FIG. 13.

FIG. 14 illustrates an example of an indication of APs in an AP MLD in a ML element according to an embodiment of the present disclosure. FIG. 15 illustrates an example of an indication of APs in an AP MLD in a ML element of a non-transmitted BSSID profile according to an embodiment of the present disclosure. FIG. 14 and FIG. 15 illustrate that, in some embodiments, in the MLD-level discovery, the reporting AP carries a bitmap subfield, to indicate whether each AP, which is affiliated with the same AP MLD as the reporting AP, supports sensing or not. The reporting AP carries this indication as specified in basic variant ML element(s) (as illustrated in FIG. 14) and/or basic variant ML element(s) contained in multiple BSSID element(s) (as illustrated in FIG. 15). The reporting AP carries a modified TBTT information set (as illustrated in FIG. 11) of a reduced neighbor report (RNR) element for any other reported APs neither specified as illustrated in FIG. 14 nor FIG. 15. In some embodiments, SENS bitmap present: set to 1 if SENS bitmap subfield presents, set to 0 otherwise. SENS Bitmap: each bit indicates a link of the AP MLD that supports sensing, in incremental sequence of a link ID (e.g. if MLD has link 2, 8, 11, then bit 0 for link 2, bit 1 for link 8, bit 3 for link 11). Note that per the format of link ID field, there can be up to 16 STA-profiles overall. In addition, FIG. 14 is applicable if the reporting AP is affiliated with an AP MLD, and may not use the modified TBTT information set in RNR element to indicate the reported APs which are affiliated with the same AP MLD as the reporting AP. FIG. 15 is applicable in the following cases: Case 1, the reporting AP is corresponding to a transmitted BSSID in a multiple BSSID element and the reporting AP is affiliated with an AP MLD. The indication of the AP MLD, with which the reporting AP is affiliated, is carried as illustrated in FIG. 14. The indication of other AP MLDs, with which the corresponding AP of a non-transmitted BSSID is affiliated, is carried as illustrated in FIG. 15. Case 2, the reporting AP is corresponding to a transmitted BS SID in a multiple BSSID element and the reporting AP is not affiliated with any AP MLD. The indication of the reporting AP is carried as illustrated in FIG. 8 or FIG. 9. The indication of AP MLDs, with which the corresponding AP of a non-transmitted BSSID is affiliated, is carried as illustrated in FIG. 15.

FIG. 16 illustrates an example of a non-AP STA carrying sensing capabilities of a non-AP MLD according to an embodiment of the present disclosure. FIG. 16 illustrates that, in some embodiments, in the link-level discovery, the non-AP STA may carry per STA sensing capabilities of the non-AP MLD with which it is affiliated in the ML probe request. FIG. 16 is an example, the non-AP STA requests partial information of AP x (Link ID=x) and complete information of AP y (Link ID=y), and the non-AP STA carries a ML SENS element for the non-AP MLD with which it is affiliated. The newly defined ML SENS element contains one SENS element for each non-AP STA (including the reporting non-AP STA itself) that supports sensing.

FIG. 17 illustrates an example of a non-AP STA carrying sensing capabilities of a non-AP MLD according to an embodiment of the present disclosure. FIG. 17 illustrates that, in some embodiments, in the link-level discovery, the non-AP STA may carry per STA sensing capabilities of the non-AP MLD with which it is affiliated in the ML probe request. FIG. 17 is another example, the non-AP STA requests partial info of AP x (Link ID=x) and complete info of AP y (Link ID=y), and the non-AP STA carries an ML SENS element for the non-AP MLD with which it is affiliated. The newly defined ML SENS element contains one SENS element for each non-AP STA (excluding the reporting non-AP STA itself) that supports sensing. The reporting non-AP STA also carries one SENS element for itself if it supports sensing, in order to support legacy AP.

FIG. 18 illustrates an example of a reporting AP support-ing sensing according to an embodiment of the present disclosure. FIG. 18 illustrates that, in some embodiments, in the link-level discovery, the AP may carry complete per AP sensing capabilities in ML probe response. FIG. 18 is applicable when the non-AP STA requests complete infor-mation of the reporting AP and Link x, y, z. In this example, the reporting AP supports sensing and has SENS element. The reported AP x (Link ID=x) supports sensing and speci-fies different sensing capabilities with the reporting AP. The reported AP y (Link ID=y) supports sensing and inherited the same sensing capabilities from the reporting AP. The reported AP z (Link ID=z) does not support sensing, as set in non-inheritance element.

FIG. 19 illustrates an example of a reporting AP not supporting sensing according to an embodiment of the present disclosure. FIG. 19 illustrates that, in some embodi-ments, in the link-level discovery, the AP may carry com-plete per AP sensing capabilities in ML probe response. FIG. 19 is applicable when the non-AP STA requests complete information of the reporting AP and Link x, y, z. In this example, the reporting AP does not support sensing. The reported AP x (Link ID=x) supports sensing and specifies its sensing capabilities. The reported AP y (Link ID=y) and z ((Link ID=x) does not support sensing.

FIG. 20 illustrates an example of a partial information of an AP according to an embodiment of the present disclosure. FIG. 20 illustrates that, in some embodiments, in the link-level discovery, the AP may carry complete per AP sensing capabilities in ML probe response. FIG. 20 is applicable when the non-AP STA requests complete information of the reporting AP and Link x, y and requests partial information of Link z. In this example, the reporting AP supports sensing and has SENS element. The reported AP x (Link ID=x) supports sensing and specifies different sensing capabilities with the reporting AP. The reported AP y (Link ID=y) supports sensing and inherited the same sensing capabilities from the reporting AP. The reported AP z (Link ID=z) supports sensing, as set in SENS element of the partial profile.

FIG. 21 illustrates an example of a response frame of a transmitted BSSID according to an embodiment of the present disclosure. FIG. 21 illustrates that, in some embodi-ments, in the link-level discovery, the AP may carry com-plete per AP sensing capabilities in ML probe response. FIG. 21 is applicable when the soliciting frame (ML probe request frame) is directed to the AP corresponding to the transmitted BS SID of a multiple BSSID set. In this example, a non-AP STA requests complete information of the reporting AP and Link x, y and requests partial information of Link z. The reporting AP supports sensing and has SENS element. The reporting AP corresponds to the transmitted BSSID of a multiple BSSID set. The reported AP x (Link ID=x) supports sensing and specifies different sensing capabilities with the reporting AP. The reported AP y (Link ID=y) supports sensing and inherited the same sensing capabilities from the reporting AP. The reported AP z (Link ID=z) supports sensing, as set in SENS element of the partial profile.

FIG. 22 illustrates an example of a response frame of a non-transmitted BSSID according to an embodiment of the present disclosure. FIG. 22 illustrates that, in some embodi-ments, in the link-level discovery, the AP may carry com-plete per AP sensing capabilities in ML probe response. FIG. 22 is applicable when the soliciting frame (ML probe request frame) is directed to the AP corresponding to a non-trans-mitted BSSID of a multiple BS SID set. In this example, the non-AP STA requested complete information of the report-ing AP and Link x, y and requests partial information of Link z. The reporting AP corresponds to the transmitted BSSID of the same multiple BSSID set of the solicited AP, and it helps the solicited AP corresponding to a non-transmitted BSSID to respond to the soliciting frame. The solicited AP is affiliated with an MLD and is one of the reported APs. The reported AP x (Link ID=x) supports sensing and specifies its sensing capabilities. The reported AP y (Link ID=y) does not support sensing. The reported AP z (Link ID=z) supports sensing, as set in SENS element of the partial profile.

Two-stage sensing discovery procedure independent with multilink discovery:

In some embodiments, the two-stage sensing discovery procedure independent with multilink discovery comprises a general sensing discovery and a SENS specific discovery (or called sensing specific discovery). In the general sensing discovery, the AP does the same as the above embodiments. In the SENS specific discovery, the non-AP STA may carry per STA sensing capabilities of the non-AP MLD with which it is affiliated in a SENS probe request. The non-AP STA may transmit one or more SENS probe request frames for different AP MLDs cached in the above embodiments, based on the priority specified. The AP may carry complete per AP sensing capabilities in SENS probe response frames, for the requested APs.

FIG. 23 illustrates an example of a non-AP STA carrying sensing capabilities of a non-AP MLD according to an embodiment of the present disclosure. FIG. 23 illustrates that, in some embodiments, in the SENS specific discovery, the non-AP STA may carry per STA sensing capabilities of the non-AP MLD with which it is affiliated in the SENS probe request. FIG. 23 is an example, the non-AP STA requests complete sensing information of the AP MLD with which the requested AP is affiliated and carries an ML SENS element for the non-AP MLD with which it is affiliated. The newly defined ML SENS element contains one SENS ele-ment for each non-AP STA (including the reporting non-AP STA itself) that supports sensing.

FIG. 24 illustrates an example of a non-AP STA carrying sensing capabilities of a MLD according to an embodiment of the present disclosure. FIG. 24 illustrates that, in some embodiments, in the SENS specific discovery, the non-AP STA may carry per STA sensing capabilities of the non-AP MLD with which it is affiliated in the SENS probe request. FIG. 24 is another example, the non-AP STA requests complete sensing information of the AP MLD with which the requested AP is affiliated and carries an ML SENS element for the non-AP MLD with which it is affiliated. The newly defined ML SENS element contains one SENS element for each non-AP STA (excluding the reporting non-AP STA itself) that supports sensing. The reporting non-AP STA also carries one SENS element for itself if it supports sensing, in order to support legacy AP.

FIG. 25 illustrates an example of an AP carrying sensing capabilities of multiple APs according to an embodiment of the present disclosure. FIG. 25 illustrates that, in some embodiments, in the SENS specific discovery, the AP may carry complete per AP sensing capabilities in SENS probe response. FIG. 25 illustrates an example, in the example, the newly defined ML SENS element contains one SENS element for each AP (excluding the reporting AP itself) that supports sensing. The reporting AP also carries one SENS element for itself if it supports sensing, in order to support legacy non-AP STA.

In summary, two-stage sensing discovery procedure comprises at least one of the followings. In a first stage, general sensing discovery: the reporting AP transmits essential sensing capabilities (include support sensing or not) of itself and reported APs. In a second stage, SENS specific discovery: the reporting AP transmits complete sensing capabilities. Optionally, for MLD, the second stage could be integrated into link-level discovery of ML discovery procedure. Optionally, the non-AP STA affiliated with an non-AP MLD may carry sensing capabilities of the non-AP MLD (not only the reporting STA but also the non-AP STAs affiliated with the same non-AP MLD) in ML probe request frames and/or SENS probe request frames. Optionally, the non-AP STA may cache the received AP MLDs' information in a priority list in the first stage and transmit one or more ML probe request frames and/or SENS probe request frames for different AP MLDs based on the priority specified.

Further, IEEE 802.11bf WG has decided to add sensing support on the R1 (Release 1) of extreme high throughput (EHT), that is add sensing support for MLD. Some of the solutions or rules described in some embodiments of the present disclosure will be probably included in 802.11bf standard, and then be adopted in the Wi-Fi AP and mobile phones.

Commercial interests for some embodiments are as follows. 1. Solving issues in the prior art. 2. Providing sensing discovery including multi-link device-level (MLD-level) discovery and/or link-level discovery. 3. Achieving extremely high throughput. 4. Providing a good communication performance. 5. Providing a high reliability. 6. Some embodiments of the present disclosure are used by chipset vendors, communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in communication specification and/or communication standards such as IEEE specification and/or to standards create an end product. Some embodiments of the present disclosure propose technical mechanisms.

FIG. 26 is a block diagram of an example system 700 for wireless communication according to an embodiment of the present disclosure. Embodiments described herein may be implemented into the system using any suitably configured hardware and/or software. FIG. 26 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the AP or STA may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method, comprising:
   performing, by an access point (AP), a first sensing discovery and a second sensing discovery which are independent with a multilink discovery, wherein in the first sensing discovery, the AP transmits a first frame to a station (STA), wherein a frame body of the first frame comprises an Extended Capabilities Element field carrying essential sensing capabilities of a reporting AP and/or one or more reported APs, wherein the essential sensing capabilities comprise a SENS Supported Capability carried in a SENS Supported subfield of the Extended Capabilities Element field, and in the second sensing discovery, the AP transmits a second frame to the STA, wherein a frame body of the second frame comprises an SENS Element carrying complete sensing capabilities of the reporting AP and/or the one or more reported APs.

2. The wireless communication method of claim 1, wherein the first sensing discovery comprises a multi-link device (MLD)-level discovery, and in the MLD-level discovery, the AP transmits, to the STA, the first frame carrying the essential sensing capabilities of the reporting AP and/or the one or more reported APs, wherein the first frame comprises a beacon frame and/or a probe response.

3. The wireless communication method of claim 2, wherein the essential sensing capabilities of the reporting AP and/or the one or more reported APs comprise an indication on whether the reporting AP and/or the one or more reported APs support sensing or not.

4. The wireless communication method of claim 3, wherein the indication comprises an AP level or a MLD level.

5. The wireless communication method of claim 4, wherein the indication comprising the MLD level is in a priority list.

6. The wireless communication method of claim 2, wherein in the MLD-level discovery, the reporting AP carries the SENS Supported subfield to indicate whether the reporting AP supports sensing or not; and/or the reporting AP carries the SENS Supported subfield for the one or more reported APs in a reduced neighbor report (RNR) element.

7. The wireless communication method of claim 3, wherein in the MLD-level discovery, the reporting AP carries the SENS Supported SubField to indicate whether the AP MLD, with which the reporting AP is affiliated, supports sensing or not; and/or the reporting AP carries the indication in a basic variant ML element and/or the basic variant ML element contained in a multiple basic service set identifier (BSSID) element; and/or the reporting AP carries a modified target beacon transmission time (TBTT) information set for the one or more reported APs in a RNR element.

8. The wireless communication method of claim 7, wherein the reporting AP is corresponding to a transmitted BSSID in the multiple BSSID element and the reporting AP is affiliated with the AP MLD.

9. The wireless communication method of claim 7, wherein the reporting AP is corresponding to a transmitted BSSID in the multiple BSSID element and the reporting AP is not affiliated with the AP MLD.

10. The wireless communication method of claim 3, wherein in the MLD-level discovery, the reporting AP carries a bitmap subfield to indicate whether the APs, which are affiliated with the same AP MLD as the reporting AP, support sensing or not.

11. The wireless communication method of claim 1, wherein the first frame further comprises a media access control (MAC) header, and the MAC header comprises at least one of a frame control field, a duration field, address fields, a sequence control field, and a HT control field.

12. The wireless communication method of claim 1, wherein the SENS Element comprises an Element ID field, a length field and an Element ID Extension field, and each of the Element ID field, the length field and the Element ID Extension field comprises 8 bits.

13. The wireless communication method of claim 1, wherein the SENS Element specifies Scheduling capabilities: pre-determined sensing session timing information.

14. A wireless communication method, comprising:
performing, by a station (STA), a first sensing discovery and a second sensing discovery which are independent with a multilink discovery, wherein in the first sensing discovery, the STA receives, from an access point (AP), a first frame, wherein a frame body of the first frame comprises an Extended Capabilities Element field carrying essential sensing capabilities of a reporting AP and/or one or more reported APs, wherein the essential sensing capabilities comprise a SENS Supported Capability carried in a SENS Supported subfield of the Extended Capabilities Element field, and in the second sensing discovery, the STA receives, from the AP, a second frame, wherein a frame body of the second frame comprises an SENS Element carrying complete sensing capabilities of the reporting AP and/or the one or more reported APs.

15. The wireless communication method of claim 14, wherein the first sensing discovery comprises a multi-link device (MLD)-level discovery, and in the MLD-level discovery, the STA receives, from the AP, the first frame carrying the essential sensing capabilities of the reporting AP and/or the one or more reported APs, wherein the first frame comprises a beacon frame and/or a probe response.

16. The wireless communication method of claim 15, wherein the essential sensing capabilities of the reporting AP and/or the one or more reported APs comprise an indication on whether the reporting AP and/or the one or more reported APs support sensing or not.

17. The wireless communication method of claim 16, wherein the indication comprises an AP level or a MLD level.

18. The wireless communication method of claim 17, wherein the indication comprising the MLD level is in a priority list.

19. The wireless communication method of claim 15, wherein in the MLD-level discovery, the reporting AP carries the SENS Supported subfield to indicate whether the reporting AP supports sensing or not; and/or the reporting AP carries the sensing supported subfield for the one or more reported APs in a reduced neighbor report (RNR) element.

20. An access point (AP), comprising:
a memory;
a transceiver; and
a processor coupled to the memory and the transceiver;
wherein the processor is configured to perform a first sensing discovery and a second sensing discovery which are independent with a multilink discovery, wherein in the first sensing discovery, the transceiver transmits a first frame to a station (STA), wherein a frame body of the first frame comprises an Extended Capabilities Element field carrying essential sensing capabilities of a reporting AP and/or one or more reported APs, wherein the essential sensing capabilities comprise a SENS Supported Capability carried in a SENS Supported subfield of the Extended Capabilities Element field, and in the second sensing discovery, the transceiver transmits a second frame to the STA, wherein a frame body of the second frame comprises an SENS Element carrying complete sensing capabilities of the reporting AP and/or the one or more reported APs.

* * * * *